(12) United States Patent
Hirata et al.

(10) Patent No.: US 10,798,553 B2
(45) Date of Patent: Oct. 6, 2020

(54) EMERGENCY REPORTING SYSTEM, EMERGENCY REPORTING DEVICE, AND EMERGENCY REPORTING METHOD

(71) Applicant: Mazda Motor Corporation, Aki-gun, Hiroshima (JP)

(72) Inventors: Daisuke Hirata, Hiroshima (JP); Hisashi Miyanohara, Aki-gun (JP); Shoichi Araki, Hatsukaichi (JP); Pingyu Lin, Hiroshima (JP); Hiroaki Tanimoto, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/493,500

(22) PCT Filed: Feb. 8, 2018

(86) PCT No.: PCT/JP2018/004285
§ 371 (c)(1),
(2) Date: Sep. 12, 2019

(87) PCT Pub. No.: WO2018/173530
PCT Pub. Date: Sep. 27, 2018

(65) Prior Publication Data
US 2020/0037141 A1    Jan. 30, 2020

(30) Foreign Application Priority Data

Mar. 24, 2017   (JP) .................................. 2017-058349

(51) Int. Cl.
*H04W 4/90* (2018.01)
*G06F 16/2455* (2019.01)
(Continued)

(52) U.S. Cl.
CPC ............ *H04W 4/90* (2018.02); *G06F 16/248* (2019.01); *G06F 16/2455* (2019.01); *G07C 5/008* (2013.01)

(58) Field of Classification Search
CPC ... G06F 16/2455; G06F 16/248; G07C 5/008; G08B 25/08; G08B 25/10; G08G 1/205;
(Continued)

(56) References Cited

U.S. PATENT DOCUMENTS 6,340,928 B1 *   1/2002   McCurdy ................. B60Q 1/52
                                                       340/436
2002/0084918 A1 *  7/2002   Roach .................... G08G 1/205
                                                       340/988
(Continued)

FOREIGN PATENT DOCUMENTS

DE    102015215294 A1    2/2017
FR         2970585 A1    7/2012
(Continued)

OTHER PUBLICATIONS

European Patent Office, Extended European Search Report Issued in Application No. 18770197.4, dated Dec. 16, 2019 Germany, 8 pages.

*Primary Examiner* — Nathan S Taylor
(74) *Attorney, Agent, or Firm* — Alleman Hall Creasman & Tuttle LLP

(57) ABSTRACT

An emergency reporting system includes first and second servers, a reporting device, a first database in which identification information of a vehicle and a vehicle model are registered, and a second database in which model-specific rescue information is registered, the first and second databases being disposed outside the vehicle. The reporting device includes a reporting unit that reports accident information of an accident vehicle to the second server. The second server includes a transfer unit that transfers the (Continued)

reported accident information to a prescribed rescue organization and the first server. The first server includes a receiving unit that receives the transferred accident information, an extracting unit that extracts rescue information of a vehicle model corresponding to identification information included in the received accident information from the first and second databases, and a transmitting unit that transmits the extracted rescue information to a terminal device of a rescue worker.

5 Claims, 11 Drawing Sheets

(51) Int. Cl.
*G06F 16/248* (2019.01)
*G07C 5/00* (2006.01)

(58) Field of Classification Search
CPC .......... H04W 4/90; H04W 4/00; G06Q 10/10; G06Q 50/26; G06Q 50/30
See application file for complete search history.

(56) References Cited

U.S. PATENT DOCUMENTS

| | | | | |
|---|---|---|---|---|
| 2004/0203919 A1* | 10/2004 | Ross | ........................ | H04L 67/18 455/456.1 |
| 2005/0236211 A1* | 10/2005 | Hirota | ................ | B60N 2/42736 180/274 |
| 2006/0011399 A1* | 1/2006 | Brockway | ................ | A61B 5/18 180/272 |
| 2006/0234726 A1* | 10/2006 | Ashley, Jr. | ............ | G01S 5/0027 455/456.4 |
| 2006/0234727 A1* | 10/2006 | Ashley, Jr. | ............ | G01S 5/0027 455/456.4 |
| 2007/0132564 A1* | 6/2007 | Dickmann | ............. | G07C 5/085 340/436 |
| 2009/0311988 A1* | 12/2009 | Johannesson | ........... | H04W 4/14 455/404.2 |
| 2012/0146766 A1* | 6/2012 | Geisler | .................... | H04W 4/90 340/8.1 |
| 2014/0295885 A1* | 10/2014 | Marko | ................. | H04W 4/029 455/456.1 |
| 2015/0019533 A1* | 1/2015 | Moody | ................. | G06F 16/951 707/722 |
| 2017/0295482 A1* | 10/2017 | Khan | ...................... | H04W 4/14 |
| 2018/0176757 A1* | 6/2018 | Kaindl | ................. | G08B 25/016 |
| 2019/0052714 A1* | 2/2019 | Shin | ........................ | H04W 4/48 |

FOREIGN PATENT DOCUMENTS

| | | | |
|---|---|---|---|
| JP | 2000298786 A | 10/2000 |
| JP | 2007503633 A | 2/2007 |
| JP | 2007133718 A | 5/2007 |

* cited by examiner

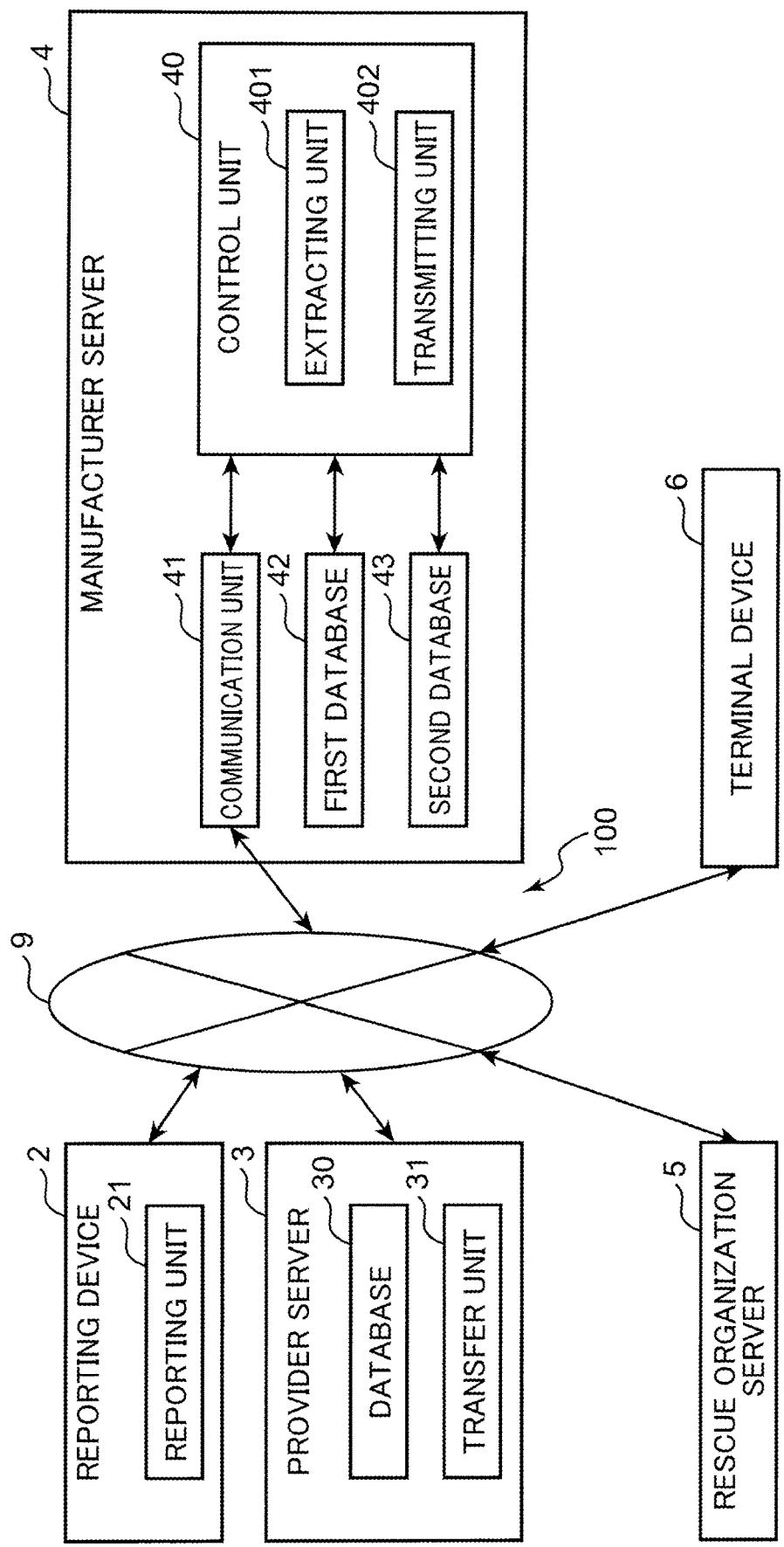

FIG. 3

| VEHICLE ID | VEHICLE INFORMATION ||||| CUSTOMER INFORMATION ||||
|---|---|---|---|---|---|---|---|---|---|
| | VEHICLE MODEL ID | VEHICLE COLOR | ... | DRIVING SOURCE | NAME | GENDER | DATE OF BIRTH | TELEPHONE NUMBER | ... |
| A | T1 | RED | ... | HEV | CUSTOMER A | MALE | YYYY/MM/DD | xxx-xxxx-xxxx | ... |
| B | T2 | RED | ... | HEV | CUSTOMER B | MALE | YYYY/MM/DD | xxx-xxxx-xxxx | ... |
| C | T3 | RED | ... | CE | CUSTOMER C | FEMALE | YYYY/MM/DD | xxx-xxxx-xxxx | ... |
| D | T4 | WHITE | ... | CE | CUSTOMER D | FEMALE | YYYY/MM/DD | xxx-xxxx-xxxx | ... |
| E | T5 | BLACK | ... | DIESEL | CUSTOMER E | MALE | YYYY/MM/DD | xxx-xxxx-xxxx | ... |
| ... | ... | ... | ... | ... | ... | ... | ... | ... | ... |

FIG. 4

| VEHICLE MODEL ID | RESCUE INFORMATION | | |
|---|---|---|---|
| | INITIAL ACTION INFORMATION | DETAILED INFORMATION | |
| | | STATE | DETAILED INFORMATION |
| T1 | INITIAL ACTION INFORMATION X1 | STATE A | DETAILED INFORMATION A1 |
| | | STATE B | DETAILED INFORMATION B1 |
| | | STATE C | DETAILED INFORMATION C1 |
| | | STATE D | DETAILED INFORMATION D1 |
| T2 | INITIAL ACTION INFORMATION X2 | STATE A | DETAILED INFORMATION A2 |
| | | STATE B | DETAILED INFORMATION B2 |
| | | STATE C | DETAILED INFORMATION C2 |
| | | STATE D | DETAILED INFORMATION D2 |
| ... | ... | ... | ... |

FIG. 8

| VEHICLE MODEL ID | RESCUE INFORMATION |
|---|---|
| T1 | RESCUE INFORMATION T1 PDF FILE |
| T2 | RESCUE INFORMATION T2 PDF FILE |
| T3 | RESCUE INFORMATION T3 PDF FILE |
| T4 | RESCUE INFORMATION T4 PDF FILE |
| T5 | RESCUE INFORMATION T5 PDF FILE |
| ... | ... |

FIG. 9

| VEHICLE MODEL ID | STATE | CONTENTS INFORMATION | | |
|---|---|---|---|---|
| | | CONTENTS OF RESCUE INFORMATION | | PAGE NUMBER |
| T1 | — | QUICK REFERENCE | CONTENTS OF INITIAL ACTION INFORMATION | 1–5 |
| | — | CAUTIONS IN INITIAL ACTION | | 5–10 |
| | — | LIST OF PREPARATION ITEMS (COMMON) | | 11–12 |
| | HIGH VOLTAGE IS NOT READY | LIST OF PREPARATION ITEMS (ABNORMALITY OF VOLTAGE SYSTEM) | CONTENTS OF DETAILED INFORMATION | 12 |
| | FUEL LEAKAGE IS PRESENT | LIST OF PREPARATION ITEMS (FIRE) | | 13 |
| | HIGH VOLTAGE IS READY AND VEHICLE RUNS AND REAR OF VEHICLE COMES INTO COLLISION AT 30 km/h OR HIGHER | HIGH-VOLTAGE BREAKING PROCEDURE | | 13–18 |
| | AIR BAG DEVICE IS IN NON-OPERATION OR PRE-TENSIONING DEVICE IS IN NON-OPERATION | PORTION-NOT-TO-BE-DISCONNECTED | | 19–25 |
| | | OPERATION AND REMOVAL OF INTERIOR PARTS | | 26–30 |
| | HIGH VOLTAGE IS READY OR FUEL LEAKAGE IS PRESENT | RESPONSE TO FIRE | | 30–32 |
| ... | ... | ... | | ... |

FIG. 10

| VEHICLE MODEL ID | RESCUE INFORMATION |
|---|---|
| T1 | RECUE INFORMATION T1 WEB PAGE |
| T2 | RECUE INFORMATION T2 WEB PAGE |
| T3 | RECUE INFORMATION T3 WEB PAGE |
| T4 | RECUE INFORMATION T4 WEB PAGE |
| T5 | RECUE INFORMATION T5 WEB PAGE |
| ... | ... |

FIG. 11

| VEHICLE MODEL ID | STATE | SOURCE FILE | |
|---|---|---|---|
| T1 | — | QUICK-REFERENCE.jpg | SOURCE FILE OF RESCUE CONTENTS INDICATING INITIAL ACTION INFORMATION |
| | — | CAUTIONS-IN-INITIAL-ACTION.txt | |
| | — | LIST-OF-PREPARATION-ITEMS(COMMON).jpg | |
| | HIGH VOLTAGE IS NOT READY | LIST-OF-PREPARATION-ITEMS (ABNORMALITY OF VOLTAGE SYSTEM).jpg | SOURCE FILE OF RESCUE CONTENTS INDICATING DETAILED INFORMATION |
| | FUEL LEAKAGE IS PRESENT | LIST-OF-PREPARATION-ITEMS(FIRE).jpg | |
| | HIGH VOLTAGE IS READY AND VEHICLE RUNS AND REAR OF VEHICLE COMES INTO COLLISION AT 30 km/h OR HIGHER | HIGH-VOLTAGE-BREAKING-PROCEDURE.mp4 | |
| | AIR BAG DEVICE IS IN NON-OPERATION OR PRE-TENSIONING DEVICE IS IN NON-OPERATION | PORTION-NOT-TO-BE-DISCONNECTED.mp4 | |
| | | OPERATION-AND-REMOVAL-OF-INTERIOR-PARTS.mp4 | |
| | HIGH VOLTAGE IS READY OR FUEL LEAKAGE IS PRESENT | OCCUPANT-SAFETY-NECESSITY-MESSAGE.txt | |
| | | RESPONSE-TO-FIRE.url | |
| ⋮ | ⋮ | ⋮ | |

US 10,798,553 B2

EMERGENCY REPORTING SYSTEM, EMERGENCY REPORTING DEVICE, AND EMERGENCY REPORTING METHOD

TECHNICAL FIELD

The present invention relates to an emergency reporting system, an emergency reporting device, and an emergency reporting method that report, to a rescue worker, cautions in rescuing an occupant in an accident vehicle.

BACKGROUND ART

Conventionally, an emergency reporting system is known which includes a provider server and a reporting device communicable with each other via a prescribed network. Specifically, in the emergency reporting system, when an emergency situation occurs in a vehicle, an emergency reporting device mounted to a vehicle or a reporting device such as a mobile phone carried by a vehicle occupant reports vehicle identification information (a vehicle number) and information about the emergency situation to the provider server. The provider server which has received the report transmits information corresponding to the reported vehicle identification information registered in advance as well as information about the reported emergency situation to a prescribed rescue organization. Accordingly, the provider server requests the rescue organization about rescue of the occupant.

As described in Patent Literature 1 listed below, in the above emergency reporting system, specification data relating to rescue of a specific vehicle is stored in a storage device fixed to a vehicle in advance. As a result, a rescue worker (rescue crew) of a rescue organization can load the specification data from the storage device fixed to the vehicle which has caused an emergency situation, and rescue an occupant safely and smoothly.

In the technique described in Patent Literature 1, however, the storage device fixed to the accident vehicle in the emergency situation might be damaged due to a collision accident or the like. In this case, the rescue worker of the rescue organization cannot load the specification data, and thus might not safely and smoothly rescue the occupant in the accident vehicle.

CITATION LIST

Patent Literature

Patent Literature 1: JP 2007-503633 A

SUMMARY OF INVENTION

The present invention has been made in view of the above problems, and an object thereof is to provide an emergency reporting system, an emergency reporting device, and an emergency reporting method with which rescue workers of a rescue organization can safely and smoothly rescue occupants in an accident vehicle.

According to one aspect of the present invention, an emergency reporting system includes a first server, a second server, and a reporting device which are communicable with each other via a prescribed network, a first database in which identification information for identifying a vehicle and a vehicle model are registered in an associated manner in advance, and a second database in which model-specific rescue information including cautions in rescuing an occupant in an accident vehicle is registered in advance, wherein the first database and the second database are disposed outside the vehicle, the reporting device includes a reporting unit that reports accident information including the identification information of the accident vehicle and state information indicating a state of the accident vehicle to the second server, the second server includes a transfer unit that transfers the reported accident information to a prescribed rescue organization and the first server, and the first server includes a receiving unit that receives the transferred accident information, an extracting unit that refers to the first database, specifies a vehicle model corresponding to the identification information included in the received accident information, and extracts rescue information of the specified vehicle model from the second database, and a transmitting unit that transmits the extracted rescue information to a terminal device carried by a rescue worker of the rescue organization.

This aspect enables a rescue worker of a rescue organization to safely and smoothly rescue an occupant in an accident vehicle.

BRIEF DESCRIPTION OF DRAWINGS

FIG. 2 is a block diagram illustrating an example of a functional configuration of the emergency reporting system.

FIG. 3 is a diagram illustrating an example of information registered in a first database.

FIG. 4 is a diagram illustrating an example of information registered in a second database according to a first embodiment.

FIG. 8 is a diagram illustrating an example of information registered in the second database according to a second embodiment.

FIG. 9 is a diagram illustrating an example of the information registered in the second database according to the second embodiment.

FIG. 10 is a diagram illustrating an example of information registered in the second database according to a third embodiment.

FIG. 11 is a diagram illustrating an example of the information registered in the second database according to the third embodiment.

DESCRIPTION OF EMBODIMENTS

First Embodiment (Overall Image of System)

Figure 1:
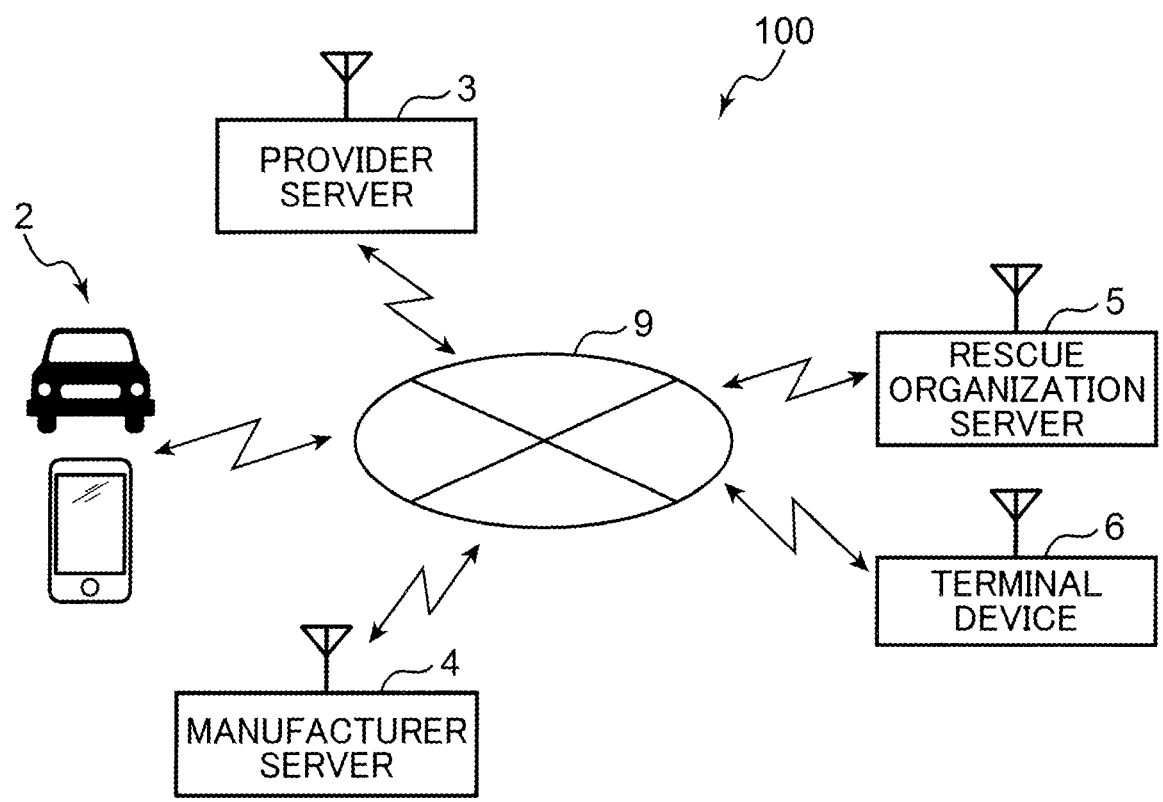
FIG. 1 is a system configuration diagram illustrating an example of an overall image of an emergency reporting system.

A first embodiment of the present invention will be described below with reference to the drawings. FIG. 1 is a system configuration diagram illustrating an example of an overall image of an emergency reporting system 100. As illustrated in FIG. 1, the emergency reporting system 100 includes a reporting device 2, a provider server 3 (a second server), and a manufacturer server 4 (a first server). The reporting device 2, the provider server 3, and the manufacturer server 4 are communicable with each other via a prescribed network 9. The network 9 includes a communication network of a mobile phone, the Internet, and the like.

The reporting device 2 is a communication device which is wirelessly communicable via the network 9. The reporting device 2 includes a mobile phone such as a smart phone carried by a vehicle occupant, an emergency reporting device disposed in a vehicle, and the like.

The provider server 3 is a server device owned by a provider which provides an emergency reporting service. The emergency reporting service is a service for requesting a rescue organization as an alliance partner to rescue an occupant in an accident vehicle in an emergency situation. The rescue organization includes a police department, a fire department, a hospital, and the like. The provider server 3 is further communicable with a rescue organization server 5 owned by the rescue organization as the alliance partner via the network 9.

The rescue organization server 5 is communicable with a terminal device 6, which is carried by a rescue worker of the rescue organization to be sent to a place where an accident vehicle is (hereinafter, an accident site), via the network 9 or a dedicated communication network (not illustrated).

The terminal device 6 is a communication device which is wirelessly communicable via the network 9. The terminal device 6 includes, for example, a tablet terminal, a smart phone, and the like. The terminal device 6 includes a display unit such as a liquid crystal display which displays information received via the network 9. Software for displaying an electronic file of an electronic document format such as a portable document format (hereinafter, PDF) on the display unit and browsing the electronic file is installed in the terminal device 6. Further, a web browser for displaying a web page on the display unit and browsing the web page is installed the terminal device 6.

The manufacturer server 4 is a server device owned by a vehicle manufacturer which has sold an accident vehicle.

The reporting device 2, the provider server 3, the manufacturer server 4, and the rescue organization server 5 each include a controller (not illustrated) that controls the self device, and a communication circuit (not illustrated) that makes communication via the network 9. The controller includes a central processing unit (CPU) (not illustrated), a non-volatile memory (not illustrated) such as an electrically erasable programmable read-only memory (EEPROM) (not illustrated), a random access memory (RAM) (not illustrated) that temporarily stores data, a timer circuit (not illustrated) that counts current date and time, their peripheral circuits, and the like.

The reporting device 2 further includes operation keys for inputting various information, a microphone (not illustrated) for inputting sounds, a speaker (not illustrated) for outputting sounds, and the like. The provider server 3, the manufacturer server 4, and the rescue organization server 5 each include a storage device (not illustrated) such as a hard disk drive (HDD), a display that displays various information, operation keys for inputting various information, and the like.

(Functional Configuration)

A functional configuration of the emergency reporting system 100 will be described below. FIG. 2 is a block diagram illustrating an example of the functional configuration of the emergency reporting system 100.

As illustrated in FIG. 2, the reporting device 2 functions as a reporting unit 21. The reporting unit 21 reports accident information about an emergency situation to the provider server 3 when the emergency situation occurs in a vehicle.

The accident information includes identification information for identifying an accident vehicle which causes an emergency situation (for example, information described on a license plate), position information of the accident vehicle (for example, information indicating a latitude, a longitude, an altitude of the position where the accident vehicle exists), state information indicating a state of the accident vehicle, and the like.

The state of an accident vehicle includes, for example, a driving source of a vehicle (for example, gasoline), an operation state of air bag devices mounted to the vehicle (for example, in operation in a driver's seat and a passenger seat, or in non-operations in a right side and a left side), an operation state of pre-tensioning devices mounted to the vehicle (for example, in operation in the driver's seat and the passenger seat), a number of collision times and each of collision portions of the vehicle (for example, rear collision at the first time, front collision at the second time), a vehicle speed at the time of collision (for example, 30 km/h), an occupant position (for example, the driver's seat, the passenger seat), usage of seat belts (for example, use in the driver's seat and the passenger seat), presence of fuel leakage (for example, fuel leakage is present), and an operation state of a high-voltage system (for example, not available (NA)).

In a case where the reporting device 2 is an emergency reporting device, the reporting unit 21 includes a controller (hereinafter, a first controller) and a communication circuit (hereinafter, a first communication circuit) provided to the emergency reporting device. Specifically, the first controller detects occurrence of an emergency situation when detection values from various sensors mounted to the vehicle are prescribed abnormal values. The first controller generates accident information using the detection values from the various sensors when detecting occurrence of the emergency situation. The first controller controls the first communication circuit so as to wirelessly transmit the generated accident information to the provider server 3 via the network 9.

On the other hand, in a case where the reporting device 2 is a mobile phone, the reporting unit 21 includes operation keys for performing an operation for making a phone call to a provider, a controller (hereinafter, a second controller), a communication circuit that makes audio communication (phone call) via a communication network of a mobile phone (hereinafter, a second communication circuit), and a microphone and a speaker for inputting and outputting audio of a communication target of the audio communication, respectively. Specifically, when making a self determination that an emergency situation occurs in a vehicle, a vehicle occupant performs an operation for making a phone call to the provider using the operation keys. In response to the operation, the second controller controls the microphone, the second communication circuit, and the speaker so as to make audio communication between a telephone machine of the provider. In this audio communication, the vehicle occupant reports accident information to an operator of the provider, by refers to various meters mounted to the vehicle and do the like. The operator inputs the reported accident information to the provider server 3.

The provider server 3 functions as a database 30 and a transfer unit 31.

The database 30 is a storage device provided to the provider server 3. The database 30 may be a storage device which is accessible via the network 9 in a manner that a controller provided to the provider server 3 (hereinafter, a third controller) controls a communication circuit provided to the provider server 3 (hereinafter, a third communication circuit) and is provided outside the vehicle.

Customer information about customers of the emergency reporting service is registered in the database 30 in advance. The customer information includes, for example, information indicating customer's gender, age, telephone number, and address, and vehicle information about vehicles owned by the customers. The vehicle information registered in the database 30 includes identification information for identifying vehicles (hereinafter, vehicle IDs), information indicating vehicle colors, and the like.

The transfer unit 31 includes the third controller and the third communication circuit. When the third communication circuit receives the accident information reported by the reporting unit 21, the transfer unit 31 controls the third communication circuit and transfers the received accident information to the rescue organization server 5 and the manufacturer server 4.

Further, when the third communication circuit receives rescue information, described below, transmitted from the manufacturer server 4, the transfer unit 31 controls the third communication circuit and transfers the received rescue information to the terminal device 6. Specifically, in this transfer, the transfer unit 31 controls the third communication circuit and transmits demand information, which is for demanding transfer of the received rescue information to the terminal device 6, together with the rescue information to the rescue organization server 5. When receiving the transmitted rescue information and demand information, the rescue organization server 5 transfers the received rescue information to the terminal device 6 based on the received demand information.

The manufacturer server 4 functions as a communication unit 41 (a receiving unit), a first database 42, a second database 43, and a control unit 40.

The communication unit 41 is a communication circuit provided to the manufacturer server 4 (hereinafter, a fourth communication circuit). When receiving the accident information transferred by the transfer unit 31, the communication unit 41 outputs the received accident information to the control unit 40. Further, the communication unit 41 transmits information instructed by the control unit 40 to an instructed device under control of the control unit 40.

Each of the first database 42 and the second database 43 is a storage device provided to the manufacturer server 4. The first database 42 and the second database 43 each may be a storage device which is accessible via the network 9 in a manner that a controller provided to the manufacturer server 4 (hereinafter, a fourth controller) controls the fourth communication circuit and is provided outside the vehicle.

FIG. 3 is a diagram illustrating an example of information registered in the first database 42. In the first database 42, as illustrated in FIG. 3, vehicle identifications (IDs) (for example, A) and vehicle information about the vehicle with the vehicle IDs are associated with each other so as to be registered in advance.

The vehicle information registered in the first database 42 includes information for identifying vehicle models (hereinafter, vehicle model IDs) (for example, T1), information indicating vehicle colors (for example, red), information indicating driving sources of the vehicles (for example, a hybrid electric vehicle (HEV)), customer information about customers who purchased the vehicles, and the like. The customer information includes, about customers who own the vehicles, such as names (for example, customer A), gender (for example, male), dates of birth (for example, YYYY/MM/DD), and telephone numbers (for example, xxx-xxxx-xxxx). That is, in the first database 42, the vehicle IDs and vehicle model IDs (vehicle models) are associated to be registered.

In the second database 43, model-specific rescue information including cautions in rescuing an occupant in an accident vehicle are registered in advance. FIG. 4 is a diagram illustrating an example of the information registered in the second database 43 according to the first embodiment. Specifically, as illustrated in FIG. 4, in the second database 43, the vehicle model IDs (for example, T1) and the rescue information are associated with each other so as to be registered in advance.

The rescue information includes initial action information indicating cautions in initial actions for rescuing an occupant in an accident vehicle (for example, initial action information X1), and detailed information including specific cautions after initial actions for rescuing an occupant in an accident vehicle.

The initial actions in rescue of an occupant in an accident vehicle includes, for example, transfer from a rescue organization to an accident vehicle, a first aid treatment for an injured occupant in the accident vehicle, and the like. The initial action information includes, for example, information indicating features relating to an appearance of a vehicle model identical to an accident vehicle model in order to make a rescue worker find an accident vehicle early and the like. The initial action information includes information indicating a list of preparation fixtures necessary for the first aid treatment in order to make a rescue worker perform the first aid treatment smoothly and the like. Further, in order to make a rescue worker perform the first aid treatment safely, the initial action information includes such as information indicating disposing position(s) of vehicle onboard fixture(s) such as a fuel tank and/or a battery. That vehicle onboard fixture(s) is (are) mounted on a vehicle of a vehicle model identical to an accident vehicle and might cause second disaster.

The detailed information is classified according to vehicle states in advance. For example, as illustrated in FIG. 4, the detailed information included in the rescue information of the vehicle model identified by the vehicle model ID "T1" is classified into four types of detailed information "detailed information A1", "detailed information B1", "detailed information C1", and "detailed information D1" which are associated with four states of an accident vehicle "state A", "state B", "state C", and "state D", respectively.

For example, an air bag device or a pre-tensioning device mounted to the accident vehicle is not in operation. The detailed information (for example, the detailed information A1) corresponding to this state (for example, state A) includes such as information indicating detailed disposing position and structure of an inflator which operates the air bag device and the pre-tensioning device. When the inflator is disconnected with the air bag device or the pre-tensioning device not in operation, the inflator might explode. On the other hand, all the air bag devices and the pre-tensioning devices mounted to an accident vehicle are in operation. Detailed information (for example, the detailed information B1) corresponding to this state (for example, the state B) includes such as information indicating that a side surface in a vehicle interior where the inflator is disposed is can be disconnected.

An accident vehicle is in a state of fuel leakage. Detailed information (for example, the detailed information C1) corresponding to this state (for example, the state C) includes such as information indicating a warning for occurrence of a fire (for example, "fire might occur") and information indicating a list of preparation items necessary for extinguishing a fire. Further, the driving source of an accident vehicle includes a high-voltage battery, and the high-voltage system of the accident vehicle is in a ready state. The detailed information (for example, the detailed information D1) corresponding to this state (for example, the state D) includes such as information for guiding shut-down of a power of the high-voltage system before operation (for example, "Shut down the system power before operation") and information indicating a procedure for shutting down the power of the high-voltage system.

Reference is made again to FIG. 2. The control unit 40 is a fourth controller. The control unit 40 functions as an extracting unit 401 and a transmitting unit 402.

The extracting unit 401 specifies a vehicle model ID (for example, T1) corresponding to a vehicle ID (for example, A) included in the accident information received by the communication unit 41 with reference to the first database 42 (FIG. 3). The extracting unit 401 extracts, from the second database 43 (FIG. 4), rescue information (for example, initial action information X1, the detailed information A1 to D1) of the vehicle model indicated by the specified vehicle model ID (for example, T1).

The transmitting unit 402 controls the fourth communication circuit so as to transmit the rescue information extracted by the extracting unit 401 to the provider server 3.

(Details of Operation for Requesting Rescue Organization to Rescue Occupant in Accident Vehicle)

Figure 5:
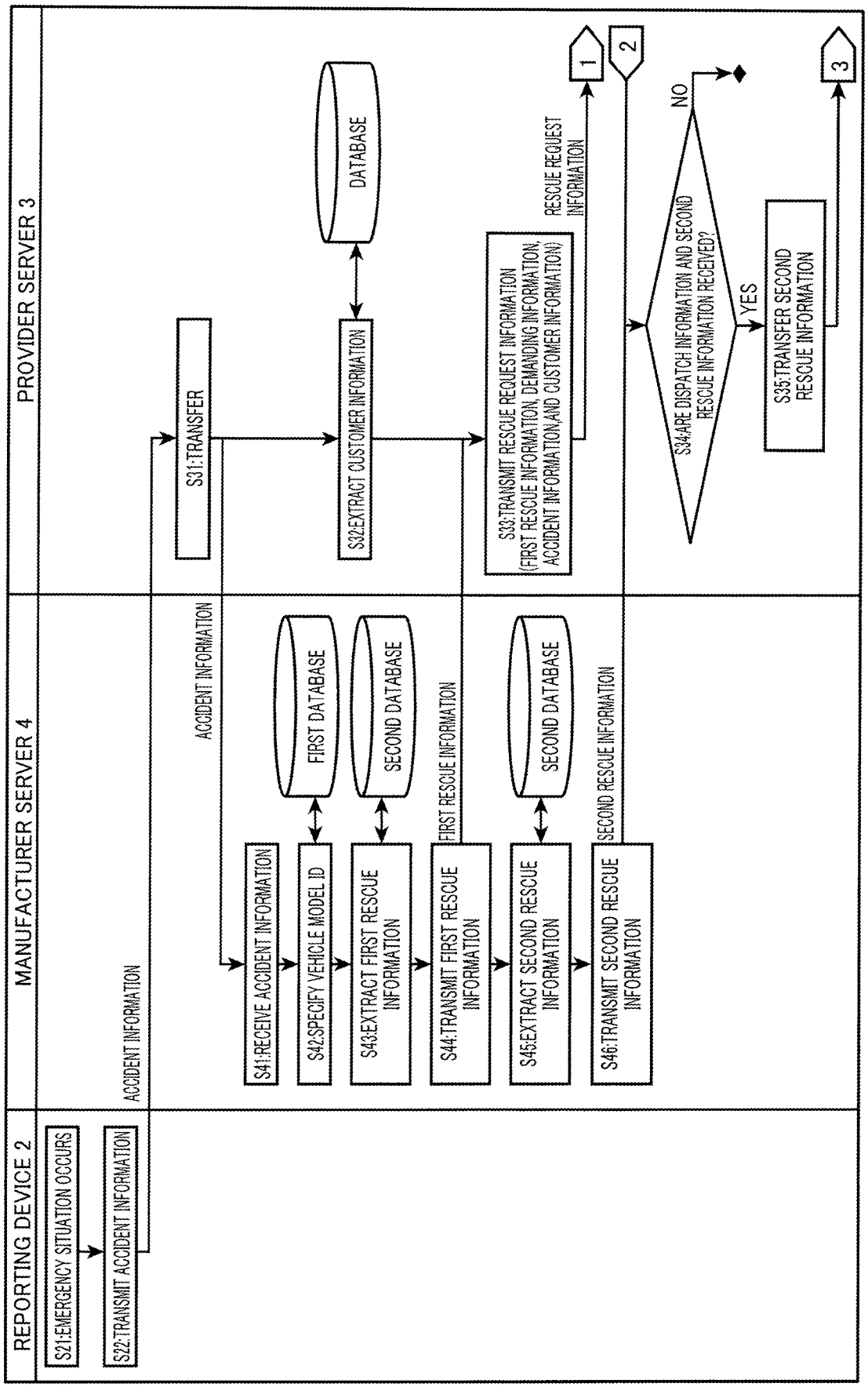
FIG. 5 is a flowchart illustrating an example of an operation for requesting a rescue organization to rescue an occupant in an accident vehicle.
Figure 6:
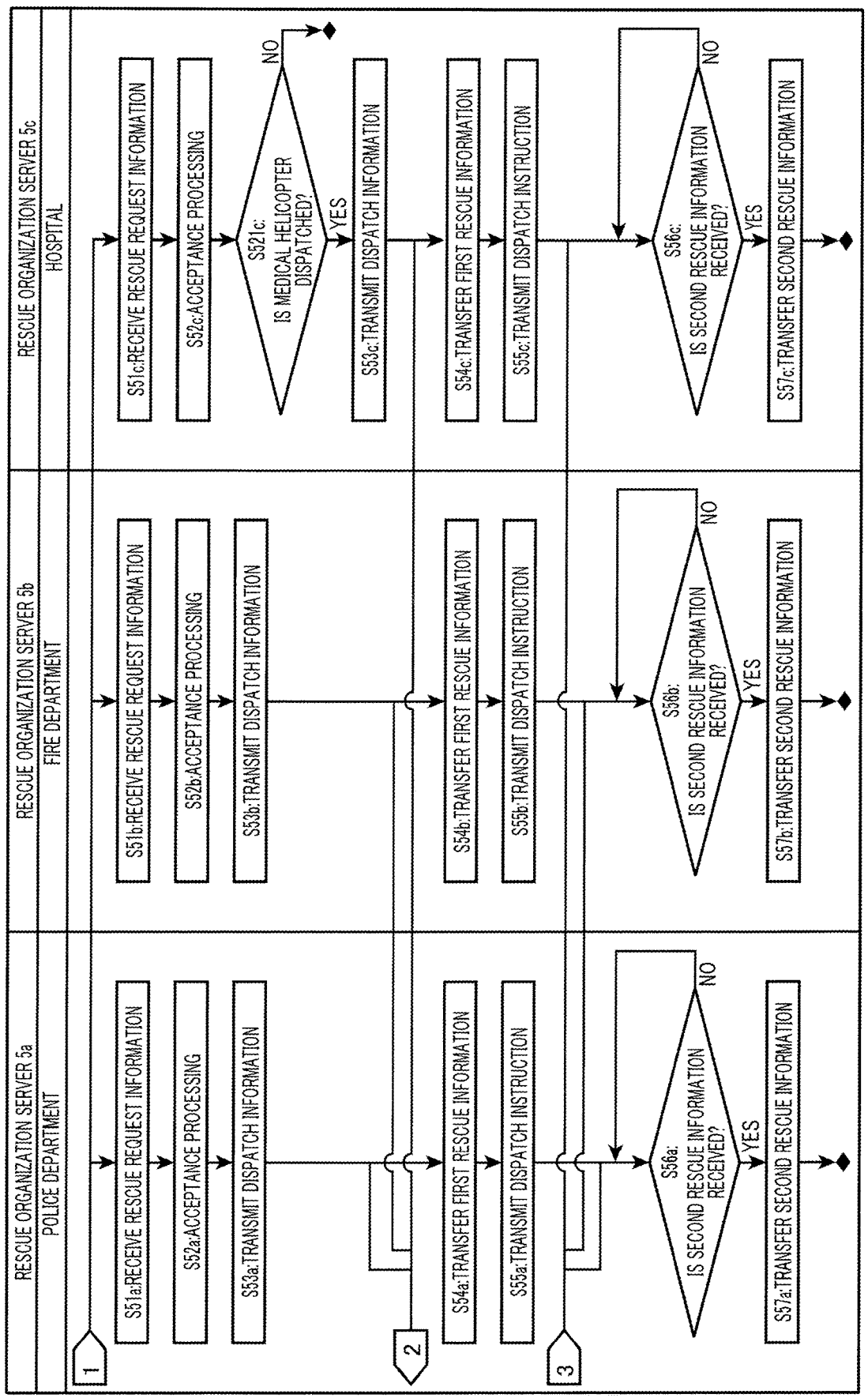
FIG. 6 is a flowchart illustrating an example of an operation for requesting the rescue organization to rescue an occupant in an accident vehicle.

Details of an operation for requesting the rescue organization to rescue an occupant in an accident vehicle in the emergency reporting system 100 will be described below. FIG. 5 and FIG. 6 are flowcharts illustrating an example of the operation for requesting the rescue organization to rescue an occupant in an accident vehicle.

As illustrated in FIG. 5, if an emergency situation occurs in an accident vehicle (step S21), the reporting unit 21 reports accident information to the provider server 3 (step S22).

In the provider server 3, if the third communication circuit receives the accident information reported by the reporting unit 21, the transfer unit 31 transfers the received accident information to the manufacturer server 4 (step S31). The third controller extracts, from the database 30, customer information which includes a vehicle ID included in the accident information received in step S31 (step S32).

In the manufacturer server 4, if the communication unit 41 receives the accident information transferred by the transfer unit 31 (step S41), the extracting unit 401 refers to the first database 42 (FIG. 3), specifies a vehicle model ID (for example, T1) associated with a vehicle ID (for example, A) included in the received accident information (step S42).

The extracting unit 401 then extracts, from the second database 43 (FIG. 4), initial action information (for example, initial action information X1) associated with the vehicle model ID (for example, T1) specified in step S42 as first rescue information (step S43). The transmitting unit 402 transmits the extracted first rescue information to the provider server 3 (step S44).

In the provider server 3, if the third communication circuit receives the first rescue information transmitted by the transmitting unit 402, the transfer unit 31 transfers rescue request information for requesting rescue of an occupant in the accident vehicle to the rescue organization server 5 of the rescue organization as an alliance partner (step S33).

The rescue request information includes the accident information received from the reporting unit 21, the customer information extracted in step S32, the first rescue information received from the transmitting unit 402, and the demand information for demanding transfer of the first rescue information to the terminal device 6. That is, in step S33, the transfer unit 31 transfers the rescue request information to the rescue organization server 5 so as to cause the rescue organization server 5 to transfer the first rescue information included in the rescue request information to the terminal device 6 based on the demand information included in the rescue request information. Thus, the transfer unit 31 transfers the first rescue information transmitted by the transmitting unit 402 to the terminal device 6.

The rescue organization as the alliance partner includes, as illustrated in FIG. 6, a police department, a fire department, and a hospital. Hereinafter, the rescue organization server 5 installed in the police department is described as a rescue organization server 5a. The rescue organization server 5 installed in the fire department is described as a rescue organization server 5b. The rescue organization server 5 installed in the hospital is described as a rescue organization server 5c.

As illustrated in FIG. 6, in the rescue organization servers 5a, 5b, and 5c, if communication circuits of the respective servers receive rescue request information (steps S51a, S51b, and S51c), controllers of the respective servers executes prescribed acceptance processing (step S52a, S52b, S52c).

In the acceptance processing, the controllers of the rescue organization servers 5a, 5b, and 5c control the communication circuits of the rescue organization servers 5a, 5b, and 5c, respectively, so as to transmit, for example, the customer information and the accident information included in the received rescue request information to devices to be used by persons in charge (hereinafter, use devices).

The person in charge of the police department (the fire department) refers to the customer information and the accident information transmitted to the use device, and determines a police officer (a fire officer) who is a rescue worker to be sent to an accident site. The person in charge of the police department (the fire department) then inputs dispatch information indicating that the determined rescue worker is sent to the accident site into the rescue organization server 5a (5b) using operation keys of the use device or the rescue organization server 5a (5b). If the dispatch information is input into the rescue organization server 5a (5b), the controller of the rescue organization server 5a (5b) causes the communication circuit of the rescue organization server 5a (5b) to transmit the input dispatch information to the provider server 3 (step S53a (S53b)).

The person in charge of the hospital refers to the customer information and the accident information transmitted by the use device, and determines whether a medical helicopter is dispatched to the accident site (step S521c). If the person in charge of the hospital determines that the medical helicopter is to be dispatched (YES in step S521c), the person in charge determines a pilot, a doctor, a nurse, and the like who are rescue workers to be sent to the accident site. The person in charge of the hospital inputs dispatch information indicating that the determined rescue workers are sent to the accident site into the rescue organization server 5c using such as operation keys provided for a use device or the rescue organization server 5c. When the dispatch information is input, the controller of the rescue organization server 5c performs control to causes the communication circuit of the rescue organization server 5c to transmit the input dispatch information to the provider server 3 (step S53c).

After transmission of the dispatch information (steps S53*a*, S53*b*, and S53*c*), the controllers of the rescue organization servers 5*a*, 5*b*, and 5*c* performs control to cause the communication circuits of the rescue organization servers 5*a*, 5*b*, and 5*c* to transfer the first rescue information included in the rescue request information to the terminal device 6, respectively, based on the demand information included in the rescue request information (steps S54*a*, S54*b*, and S54*c*).

In steps S54*a*, S54*b*, and S54*c*, the controllers of the rescue organization servers 5*a*, 5*b*, and 5*c* may transmit the accident information and the customer information, which are included in the rescue request information, together with the first rescue information to the terminal device 6.

The controllers of the rescue organization servers 5*a*, 5*b*, and 5*c* perform control to cause the communication circuits of the rescue organization servers 5*a*, 5*b*, and 5*c* to transmit, to the terminal device 6, information indicating a dispatch instruction to an accident site (steps S55*a*, S55*b*, and S55*c*). When the information indicating the dispatch instruction is transmitted to the terminal device 6, the rescue worker is dispatched to the accident site. Thus, the rescue worker browses the initial action information which is the first rescue information transferred to the terminal device 6 before heading to the accident site so as to be capable of understanding cautions in an initial action for rescuing an occupant in the accident vehicle.

After step S53*a*, step S55*a* may be executed, and after step S55*a*, step S54*a* may be executed. Similarly, after step S53*b*, step S55*b* may be executed, and after step S55*b*, step S54*b* may be executed. After step S53*c*, step S55*c* may be executed, and after step S55*c*, step S54*c* may be executed. As a result, after the dispatch of the rescue worker to the accident site is started, the first rescue information may be transferred to the terminal device 6. In such a case, while the rescue worker is heading to the accident site or before long time elapses after the rescue worker arrives at the accident site, the rescue worker can browse the initial action information transferred to the terminal device 6 so as to understand cautions in an initial action for rescuing an occupant in the accident vehicle.

Reference is made again to FIG. 5. On the other hand, in the manufacturer server 4, after step S44, the extracting unit 401 extracts, in the detailed information associated with the vehicle model ID (for example, T1) specified in step S42 in the second database 43 (FIG. 4), only the detailed information (for example, the detailed information A1 and D1) which corresponds to the states of the accident vehicle (for example, the states A and D) indicated by the state information included in the accident information received in step S41, as the second rescue information (step S45). The transmitting unit 402 transmits the extracted second rescue information to the provider server 3 (step S46).

In step S45, the extracting unit 401 extracts nothing when detailed information corresponding to the state of the accident vehicle indicated by the state information included in the accident information received in step S41 is not registered in the second database 43. In this case, the transmitting unit 402 transmits nothing to the provider server 3 in step S46.

In the provider server 3, the third communication circuit receives the second rescue information transmitted by the transmitting unit 402 and the dispatch information transmitted by the rescue organization servers 5*a*, 5*b*, and 5*c* (YES in step S34). In this case, the transfer unit 31 transfers the second rescue information received from the transmitting unit 402 to the terminal device 6 carried by the rescue worker to be sent to the accident site (step S35).

Specifically, in a case where the third communication circuit receives the dispatch information while receiving the second rescue information and a prescribed time elapses thereafter, and in a case where the third communication circuit receives the dispatch information and then the second rescue information (YES in step S34), step S35 is executed. In such a case (NO in step S34), step S35 is not executed. In step S35, the transfer unit 31 transmits, to the rescue organization servers 5*a*, 5*b*, and 5*c*, the second rescue information received from the transmitting unit 402 and the demand information, which is for demanding transfer of the second rescue information to the terminal device 6.

As illustrated in FIG. 6, in the rescue organization servers 5*a*, 5*b*, and 5*c*, the respective communication circuits receive the second rescue information and the demand information (YES in steps S56*a*, S56*b*, and S56*c*). In this case, the respective controllers transfer the received second rescue information to the terminal device 6 carried by the rescue worker based on the received demand information (steps S57*a*, S57*b*, and S57*c*) in the similar manner in steps S54*a*, S54*b*, and S54*c*.

As described above, according to the first embodiment, the model-specific rescue information including cautions in rescuing an occupant in an accident vehicle is registered in the second database 43 disposed outside the vehicle in advance. The rescue information, which is extracted from the second database 43 and is associated with the vehicle model ID of the accident vehicle, is transmitted to the terminal device 6 carried by the rescue worker of the rescue organization.

Thus, even in a case where equipment such as a storage device mounted to the accident vehicle is damaged due to a collision accident or the like, the rescue worker can refer to cautions in rescuing an occupant in a vehicle which is identical in a vehicle model to the accident vehicle, the cautions being included in the rescue information transmitted to the terminal device 6 carried by the rescue worker. Consequently, the rescue worker can safely and smoothly rescue an occupant in the accident vehicle while following the referred cautions.

Further, according to the first embodiment, after the initial action information indicating the cautions in the initial action for rescuing the occupant in the accident vehicle is transmitted, only the detailed information corresponding to a state of the accident vehicle is transmitted to the terminal device 6.

Thus, upon transmission of the initial action information to the terminal device 6, the rescue worker can quickly refer to the cautions indicated by the initial action information, and safely and smoothly take the initial action in the rescue of an occupant. After taking the initial action for rescuing the occupant, the rescue worker can refer to the cautions included in the detailed information corresponding to the state of the accident vehicle without referring to cautions included in the detailed information which does not correspond to the state of the accident vehicle. This enables the rescue worker to safely and smoothly rescue the occupant depending on the state of the accident vehicle.

According to the first embodiment, the rescue information extracted in the manufacturer server 4 is transmitted to the terminal device 6 carried by the rescue worker via the provider server 3. This can save the manufacturer server 4 from managing such as information about destinations of the rescue organization servers 5a, 5b, and 5c, the destinations being necessary for transmitting the rescue information to the terminal device 6.

(First Modification of First Embodiment)

Figure 7:
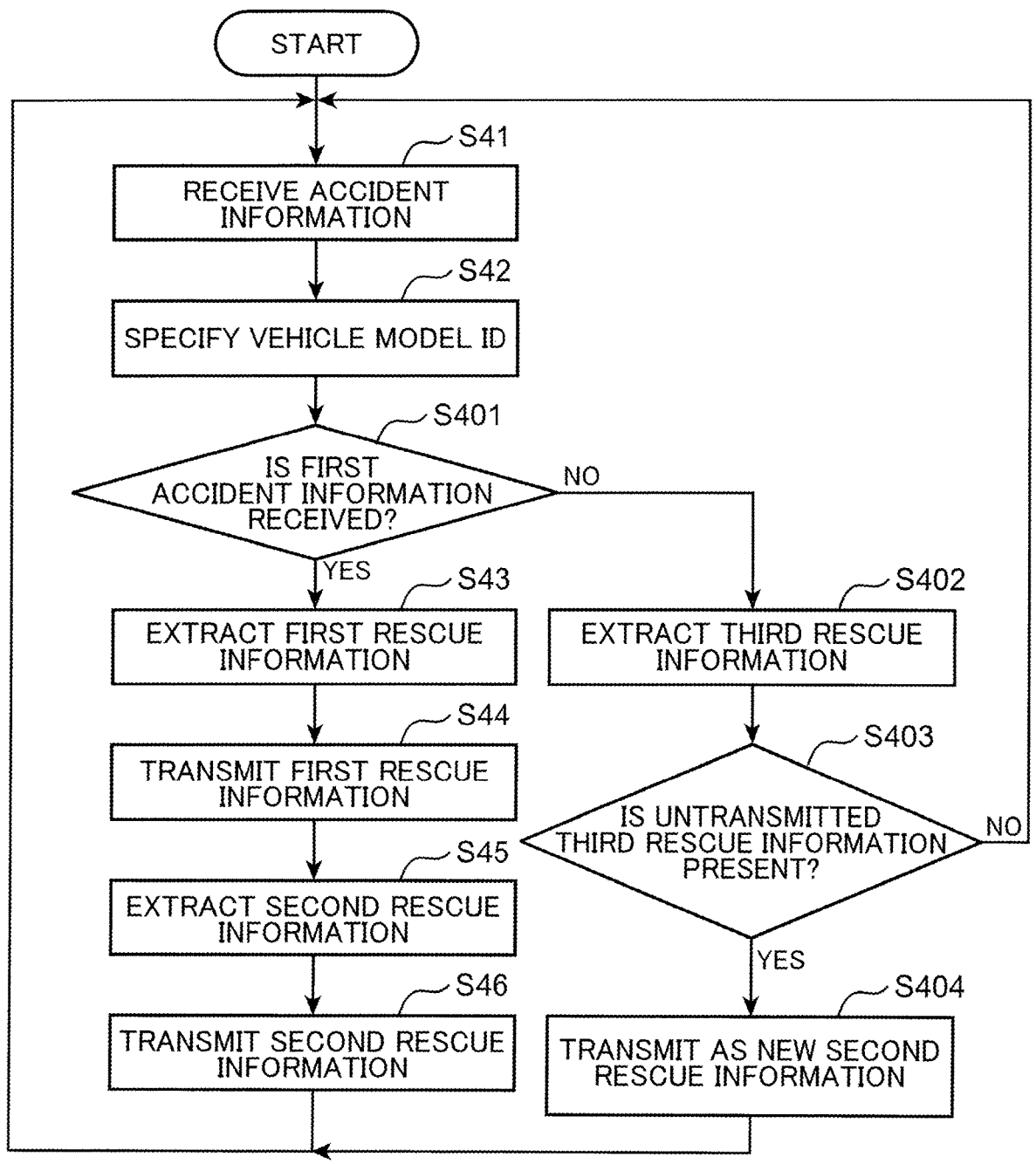
FIG. 7 is a flowchart illustrating a modification of an operation in a manufacturer server.

In the emergency reporting system 100 according to the first embodiment, after reporting the accident information, the reporting unit 21 may periodically report accident information including state information indicating a current state of the accident vehicle (hereinafter, current state information) to the provider server 3. Accordingly, the transfer unit 31 may transfer the accident information including the current state information to the manufacturer server 4, and the extracting unit 401 and the transmitting unit 402 may perform the operation according to the flow illustrated in FIG. 7. FIG. 7 is a flowchart illustrating a modification of the operation in the manufacturer server 4.

The operation in the manufacturer server 4 illustrated in FIG. 7 will be described below. As illustrated in FIG. 7, after steps S41 and S42 are executed, the extracting unit 401 determines whether the accident information received in previous step S41 is accident information received first (step S401).

Specifically, in step S401, if the vehicle ID included in the accident information received by the reporting unit 21 is not stored in the RAM of the fourth controller, the extracting unit 401 determines that the accident information received in previous step S41 is the accident information received first (YES in step S401), and stores the vehicle ID in the RAM. On the other hand, if the vehicle ID included in the accident information received by the reporting unit 21 is stored in the RAM of the fourth controller, the extracting unit 401 determines that the accident information received in previous step S41 is not the accident information received first (NO in step S401).

If the extracting unit 401 determines in step S401 that the accident information received in previous step S41 is the accident information received first (YES in step S401), the processing in step S43 to step S46 is further executed, and then the processing returns to S41. Thereafter, every time when the reporting unit 21 periodically transmits the accident information including the current state information, the processing in step S41 and subsequent steps is executed.

On the other hand, in step S401, the extracting unit 401 determines that the accident information is not the accident information that is received first (NO in step S401). In this case, similarly to step S45, from the detailed information associated with the vehicle model ID (for example, T1) specified in step S42 in the second database 43 (FIG. 4), the extracting unit 401 extracts only the detailed information (for example, the detailed information A1, C1, and D1), which corresponds to the current states (for example, the states A, C, and D) of the accident vehicle indicated by the current state information included in the accident information received in step S41, as the third rescue information (step S402).

The transmitting unit 402 then determines whether the third rescue information which is not included in the transmitted second rescue information exists in the third rescue information extracted in step S402 (step S403).

In step S403, the transmitting unit 402 determines that the third rescue information (for example, the detailed information C1) which is not included in the transmitted second rescue information (for example, the detailed information A1 and D1) exists in the third rescue information (for example, the detailed information A1, C1, and D1) extracted in step S402 (YES in step S403). In this case, similarly to step S46, the transmitting unit 402 transmits the third rescue information (for example, the detailed information C1), which is not included in the transmitted second rescue information (for example, detailed information A1 and D1), as new second rescue information to the provider server 3 (step S404). Thereafter, in the manufacturer server 4, the processing in step S41 and subsequent steps is executed, and in the provider server 3, the processing in step S34 (FIG. 5) and subsequent steps is executed.

If the transmitting unit 402 determines in step S403 that third rescue information which is not included in the transmitted second rescue information does not exist in the third rescue information extracted in step S402 (NO in step S403), the processing returns to step S41. Thereafter, the processing in step S41 and subsequent steps is executed.

In this configuration, the manufacturer server 4 periodically receives the accident information including the current state information indicating the current state of the accident vehicle via the provider server 3. In the detailed information which is extracted as the third rescue information and which corresponds to the current state of the accident vehicle indicated by the current state information, only detailed information which is not transmitted as the second rescue information is transmitted as new second rescue information to the terminal device 6 carried by the rescue worker.

This can prevent detailed information of identical contents from being periodically transmitted to the terminal device 6 carried by the rescue worker. As a result, only detailed information including cautions to be necessarily referred to by the rescue worker due to a change in the state of the accident vehicle can be transmitted to the terminal device 6 carried by the rescue worker.

Second Modification of First Embodiment

Further, according to the first embodiment and the first modification of the first embodiment, in step S45 (FIGS. 5 and 7), the extracting unit 401 may extract all the detailed information (for example, the detailed information A1, B1, C1, and D1), which is associated with the vehicle model ID (for example, T1) specified in step S42, from the second database 43 (FIG. 4).

Third Modification of First Embodiment

Step S44 (FIGS. 5 and 7) in the first embodiment and the first and second modifications of the first embodiment may be omitted. In step S46 (FIGS. 5 and 7), the transmitting unit 402 may transmit the first rescue information extracted in step S43 and the second rescue information extracted in step S45 to the provider server 3 at the same timing, as the second rescue information (the rescue information). Accordingly, the first rescue information and the demand information are not included in the rescue request information transferred by the transfer unit 31 in step S33 (FIG. 5), and steps S54a, S54b, and S54c (FIG. 6) may be omitted.

Fourth Modification of First Embodiment

Further, in the first embodiment and the first to third modifications of the first embodiment, the transfer unit 31 may not transfer the first rescue information to the terminal device 6 in step S33 (FIG. 5). Accordingly, in the case where step S44 (FIG. 5) is executed, the transmitting unit 402 may transmit the first rescue information to the terminal device 6 instead of the provider server 3.

Specifically, in step S33, the transfer unit 31 may prevent the rescue request information, which is to be transferred to the rescue organization servers 5a, 5b, and 5c, from including the first rescue information and the demand information. In step S44, the transmitting unit 402 may transmit, to the rescue organization servers 5a, 5b, and 5c, the first rescue information and the demand information for demanding the transfer of the first rescue information to the terminal device 6.

In steps S54a, S54b, and S54c (FIG. 6), the communication circuits of the rescue organization servers 5a, 5b, and 5c receive the first rescue information and the demand information transmitted from the transmitting unit 402. In this case, the controllers of the rescue organization servers 5a, 5b, and 5c may transfer the received first rescue information to the terminal device 6 based on the received demand information.

Similarly, steps S34 and S35 (FIG. 5) may be omitted. When executing step S46 (FIG. 5), the transmitting unit 402 may transmit the second rescue information to the terminal device 6 instead of the provider server 3.

Specifically, in step S46, the transmitting unit 402 may transmit, to the rescue organization servers 5a, 5b, and 5c, the second rescue information and the demand information for demanding the transfer of the second rescue information to the terminal device 6. Thus, the controllers of the rescue organization servers 5a, 5b, and 5c may transfer the received second rescue information to the terminal device 6 based on the received demand information.

In the present modification, the transmitting unit 402 transmits the rescue request information to the rescue organization servers 5a, 5b, and 5c, and thus the manufacturer server 4 needs to acquire destinations of the rescue organization servers 5a, 5b, and 5c. Thus, for example, before transmitting the rescue request information to the rescue organization server 5, the transmitting unit 402 may transmit destination demand information for demanding transmission of the destinations to the provider server 3. When receiving the destination demand information, the provider server 3 may return information indicating the destinations of the rescue organization servers 5a, 5b, and 5c to the manufacturer server 4. Alternatively, in step S31 (FIG. 5), the transfer unit 31 may transfer the information, which indicates the destinations of the rescue organization servers 5a, 5b, and 5c to be used for transfer of the accident information to the rescue organization servers 5a, 5b, and 5c, together with the accident information to the manufacturer server 4.

Second Embodiment

A second embodiment of the present invention will be described below. In this description, description about the configuration and the operation identical to those in the first embodiment will be omitted. In the second embodiment, model-specific rescue information is registered in the second database 43 in advance as an electronic document in which a brochure containing cautions in rescuing an occupant in an accident vehicle is described in a portable document format (hereinafter, PDF).

FIG. 8 is a diagram illustrating an example of information registered in the second database 43 according to the second embodiment. Specifically, as illustrated in FIG. 8, PDF electronic files (for example, rescue information T1PDF file), which are associated with the vehicle model IDs (for example, T1) and indicate the model-specific rescue information, are registered in the second database 43 according to the second embodiment in advance.

Thus, the rescue worker can browse each page of the brochure for cautions contained in the brochure indicated by model-specific rescue information registered in the second database 43 in advance using an information processing apparatus such as a personal computer, which is accessible to the second database 43 and with which an electronic document described in PDF can be browsed.

Also in the second embodiment, the model-specific rescue information is classified according to vehicle states in advance. FIG. 9 is a diagram illustrating an example of the information registered in the second database 43 according to the second embodiment. Specifically, as illustrated in FIG. 9, a table of contents in which the vehicle model IDs (for example, T1), the vehicle states (for example, fuel leakage), and content information are associated with each other is registered in the second database 43 in advance. The content information is information in which contents (for example, a list of the preparation items (fire)) of the rescue information contained in the brochure indicated by the rescue information of the vehicle model ID (for example, T1) corresponding to the content information are associated with page numbers (for example, 13) on which the rescue information is described.

Also in the second embodiment, the model-specific rescue information includes initial action information and detailed information. As illustrated in FIG. 9, the contents of the initial action information (for example, quick reference) are associated with a state "-" indicating that the vehicle is in any state in the table of contents. The contents of the detailed information (for example, a portion not to be disconnected) are associated with vehicle states (for example, the air bag device is in non-operation or the pre-tensioning device is in non-operation), respectively, in the table of contents.

In the second embodiment, an operation for requesting the rescue organization to rescue an occupant in an accident vehicle is similar to the operation according to the first embodiment. In the manufacturer server 4, however, the following processing is executed in steps S43 and S45 (FIG. 5).

In step S43 (FIG. 5), the extracting unit 401 extracts initial action information, which is registered in the second database 43 (FIG. 8) and is included in the rescue information of the vehicle model associated with the vehicle model ID specified in step S42 (FIG. 5), as the first rescue information (first state-specific rescue information). The extraction is carried out page by page from the brochure indicated by the rescue information of the vehicle model.

Specifically, in step S43 (FIG. 5), the extracting unit 401 acquires page numbers (for example, 1 to 5, 5 to 10, and 11 to 12) associated with the vehicle model ID (for example, T1) specified in step S42 and the state "-" from the table of contents (FIG. 9) registered in the second database 43.

The extracting unit 401 then acquires, from the second database 43 (FIG. 8), an electronic file (for example, a rescue information T1 PDF file) which indicates the rescue information of the vehicle model associated with the vehicle model ID (for example, T1) specified in step S42. The extracting unit 401 regards all the information described on the pages with acquired page numbers (for example, 1 to 5, 5 to 10, and 11 to 12) included in the brochure indicated by the acquired electronic file as the initial action information, and extracts all the information as the first rescue information.

In step S45 (FIG. 5), the extracting unit 401 extracts, from the rescue information of the vehicle model associated with the vehicle model ID specified in step S42, only the detailed information (the rescue information) corresponding to the state of the accident vehicle indicated by the state information included in the accident information received in S41, the rescue information being registered in the second database 43 (FIG. 8), as second rescue information (second state-specific rescue information). The extraction is carried out page by page on the brochure indicated by the rescue information of the vehicle model.

Specifically, in step S45 (FIG. 5), the extracting unit 401 acquires, from the table of contents (FIG. 9) registered in the second database, page numbers (for example, 19 to 25), which are associated with the vehicle model ID (for example, T1) specified in step S42 and the state of the accident vehicle (for example, the air bag is in non-operation or the pre-tensioning device is in non-operation) indicated by the state information included in the accident information received in step S41.

The extracting unit 401 then acquires, from the second database 43 (FIG. 8), an electronic file (for example, a rescue information T1 PDF file) which indicates the rescue information of the vehicle model associated with the vehicle model ID (for example, T1) specified in step S42. The extracting unit 401 regards all information, which is described on the pages with acquired page numbers (for example, 19 to 25) included in the brochure indicated by the acquired electronic file, as the detailed information corresponding to the state of the accident vehicle, and extracts all the information as the second rescue information.

The electronic file indicating rescue information of a vehicle model may be registered in the second database 43 (FIG. 8) dividedly page by page of the brochure indicated by the electronic file. Accordingly, in step S45 (step S43), the extracting unit 401 does not acquire the electronic file for all the pages indicating the rescue information of the vehicle model corresponding to the vehicle model ID specified in step S42, but may acquire only the electronic file corresponding to the acquired page numbers from the table of contents (FIG. 9). The extracting unit 401 may regard all the information described in the acquired electronic file as the detailed information (the initial action information) corresponding to the state of the accident vehicle, and may extract all the information as the second rescue information (the first rescue information).

Specific Example

A specific example of a case where a vehicle collides directly into a pole at 30 km/h will be described below. The information illustrated in FIGS. 8 and 9 is registered in the second database 43 in advance. The vehicle model ID specified in step S42 (FIG. 5) by the extracting unit 401 is "T1". Further, in step S22 (FIG. 5), a state of the accident vehicle indicated by the state information included in the accident information reported to the provider server 3 by the reporting unit 21 is described below.

The vehicle driving source: diesel, operation states of the respective air bag devices: in operation in the driver's seat and the passenger seat but in non-operation in the right side and the left side, the operation states of the pre-tensioning devices: in operation in the driver's seat and the passenger seat, a number of vehicle collision times and collided portions: front at first time, a vehicle speed at the time of collision: 30 km/h, occupant position: driver's seat and rear left seat, usage of seat belts: use in the driver's seat and the rear left seat, presence of fuel leakage: fuel leakage is present, and the operation state of the high-voltage system: not available (NA).

In this case, in step S43 (FIG. 5), the extracting unit 401 acquires the page numbers "1 to 5, 5 to 10, and 11 to 12" associated with the vehicle model ID "T1" and the state "-" from the table of contents (FIG. 9) registered in the second database 43. The extracting unit 401 then extracts all the information described on the pages "1 to 5, 5 to 10, and 11 to 12" as the first rescue information from the electronic file "rescue information T1 PDF file", which is registered in in the second database 43 (FIG. 8) and indicates the rescue information of the vehicle model associated with the vehicle model ID "T1".

Thus, in step S44 (FIG. 5), the first rescue information, which includes the rescue information indicating "quick reference, cautions at the initial action time, and list of preparation items (common)" associated with the page numbers "1 to 5, 5 to 10, and 11 to 12" in the table of contents (FIG. 9), is transmitted to the provider server 3. As a result, the first rescue information is transmitted to the terminal device 6.

The state of the accident vehicle indicated by the state information included in the accident information includes "the operation states of the air bag devices: in non-operation in the right side and the left side". Thus, in step S45 (FIG. 5), the extracting unit 401 acquires page numbers "19 to 25" associated with the vehicle state "the air bag device is in non-operation or the pre-tensioning device is in non-operation" in the table of contents (FIG. 9).

The state of the accident vehicle indicated by the state information included in the accident information includes "presence of fuel leakage: fuel leakage is present". Thus, in step S45 (FIG. 5), the extracting unit 401 acquires a page number "13" associated with the vehicle state "fuel leakage is present" and page numbers "26 to 30 and 30 to 32" associated with the vehicle state "high voltage is ready or fuel leakage is present" in the table of contents (FIG. 9).

The extracting unit 401 then extracts all the information described on the pages with acquired page numbers "13, 26 to 30, and 30 to 32" as the second rescue information from the electronic file "rescue information T1 PDF file" which is registered in the second database 43 (FIG. 8) and indicates the rescue information of the vehicle model associated with the vehicle model ID "T1".

Thus, in step S46 (FIG. 5), the second rescue information, which includes rescue information indicating "list of preparation items (fire), operation and removal of interior parts, and response to fire" associated with the page numbers "13, 26 to 30, 30 to 32" in the table of contents (FIG. 9), is transmitted to the provider server 3. As a result, the second rescue information is transmitted to the terminal device 6.

As described above, according to the second embodiment, the rescue information, which corresponds to a state of the accident vehicle extracted from the rescue information of the vehicle model corresponding to the vehicle ID of the accident vehicle registered in the second database 43, is transmitted to the terminal device 6 carried by the rescue worker of the rescue organization.

For this reason, even in a case where equipment such as the storage device mounted to the accident vehicle is damaged due to a collision accident or the like, the rescue worker can refer to only cautions corresponding to the state of the accident vehicle included in the rescue information transmitted to the terminal device 6 carried by the rescue worker without referring to cautions which does not correspond to the state of the accident vehicle. Thus, the rescue worker can safely and smoothly rescue an occupant in the accident vehicle appropriately to the state of the accident vehicle while following the referred cautions.

Further, according to the second embodiment, the first (second) rescue information is extracted page by page in the brochure indicated by the rescue information of the vehicle model corresponding to the vehicle model ID specified in step S42. Thus, all information contained in at least the pages including the first (second) rescue information is quickly extracted as the first (second) rescue information from all the information included in the pages containing the first (second) rescue information without extracting only the first (second) rescue information.

(First Modification of Second Embodiment)

Also in the emergency reporting system 100 according to the second embodiment, similarly to the first modification of the first embodiment, the reporting unit 21 may periodically report accident information including current state information to the provider server 3 after reporting accident information. Accordingly, the transfer unit 31 may transfer the accident information including the current state information to the manufacturer server 4, and the extracting unit 401 and the transmitting unit 402 may perform the operation according to the flow illustrated in FIG. 7.

In this case, in step S402 (FIG. 7), similarly to the processing in step S45 according to the second embodiment, the extracting unit 401 extracts, from the rescue information of the vehicle model which is registered in the second database 43 (FIG. 8) and is associated with the vehicle model ID specified in step S42, only detailed information corresponding to a current state of the accident vehicle indicated by current state information included in the accident information received in step S41 as third rescue information (third state-specific rescue information). The extraction is carried out page by page on the brochure indicated by the rescue information of the vehicle model.

Second Modification of Second Embodiment

In the second embodiment and the first modification of the second embodiment, the extracting unit 401 extracts the first (second and third) rescue information page by page from the brochure indicated by the rescue information of the vehicle model in step S43 (steps S45 and S402). Alternatively, in step S43 (steps S45 and S402), the extracting unit 401 may extract only initial action information (detailed information corresponding to a state of the accident vehicle) described on the page with page numbers acquired from the table of contents (FIG. 9) as the first (second and third) rescue information.

Specifically, information (titles) indicating contents of the initial action information and the detailed information (for example, list of preparation items (common) and the list of preparation items (abnormality of the voltage system)) included in contents information (FIG. 9) may be included in top of the initial action information and the detailed information on a page (for example, page 12 (FIG. 9)) containing the initial action information and detailed information corresponding to one or more vehicle states in advance. Similarly, information (titles) indicating the contents of the detailed information (for example, operation and removal of interior parts, and response to fire) included in the content information (FIG. 9) may be included in top of detailed information on a page (for example, page 30 (FIG. 9)) containing detailed information corresponding to states of a plurality of vehicles in advance.

The information (titles) indicating the contents of the rescue information associated with the page number in the content information (FIG. 9) is included in a page with the page number acquired from the table of contents (FIG. 9) by the extracting unit 401. In this case, the extracting unit 401 may extract, from a position where the information indicating the contents of the rescue information is described, only information which is described on a position where information (title) indicating the contents of another rescue information is described or before the end position of the page. In a case where the information (titles) indicating the contents of the rescue information associated with the page number in the content information (FIG. 9) is not included in the page with the page number acquired from the table of contents (FIG. 9), the extracting unit 401 may extract all information described on the page.

Third Modification of Second Embodiment

Also in the second embodiment and the first and second modifications of the second embodiment, similarly to the third modification of the first embodiment, step S44 (FIGS. 5 and 7) may be omitted. In step S46 (FIGS. 5 and 7), the transmitting unit 402 may transmit the first rescue information extracted in the processing in step S43 and the second rescue information extracted in the processing in step S45 to the provider server 3 at the same timing, as the second rescue information (the state-specific rescue information). Accordingly, the first rescue information and the demand information are not included in the rescue request information transferred by the transfer unit 31 in step S33 (FIG. 5), and steps S54a, S54b, and S54c (FIG. 6) may be omitted.

Fourth Modification of Second Embodiment

Also in the second embodiment and the first to third modifications of the second embodiment, similarly to the fourth modification of the first embodiment, if the transfer unit 31 does not transfer the first rescue information to the terminal device 6 in step S33 (FIG. 5) and the transmitting unit 402 executes step S44, the transmitting unit 402 may transmit the first rescue information to the terminal device 6. If steps S34 and S35 (FIG. 5) are omitted and the transmitting unit 402 executes step S46 (FIG. 5), the second rescue information may be transmitted to the terminal device 6.

Fifth Modification of Second Embodiment

In the second embodiment and the first to fourth modifications of the second embodiment, the model-specific rescue information registered in the second database 43 in advance may be an electronic document in which a brochure containing cautions in rescuing an occupant in an accident vehicle is described in an electronic document format (for example, XML Paper Specification (XPS)) different from PDF.

Third Embodiment

A third embodiment of the present invention will be described below. Description about the configuration and operation identical to those of the first and second embodiments will be omitted. In the third embodiment, web pages containing rescue information including cautions in rescuing an occupant in an accident vehicle are registered for each of vehicle models in the second database 43 in advance.

The web page indicates an entire page to be displayed by a web browser, and include one or more web contents indicating rescue information. The web contents indicating the rescue information (hereinafter, rescue contents) include such as a text, a still image and a moving image indicating the rescue information. Further, the rescue contents include an URL of the rescue contents stored in a storage device communicable with the terminal device 6.

The web page includes, for example, a combination of a source file of the rescue contents included in the web page, and an HTML file including an HTML tag (for example, <object data="source file name of the rescue contents">) for specifying that the rescue contents are included in the web page.

FIG. 10 is a diagram illustrating an example of information registered in a second database 43 according to the third embodiment. Specifically, as illustrated in FIG. 10, web pages (for example, rescue information T1 web page) containing rescue information of vehicle models in association with vehicle model IDs (for example, T1) are registered in the second database 43 according to the third embodiment in advance.

For this reason, the cautions included in the rescue information, which is registered in the second database 43 in advance and is described on the model-specific web page, can be browsed while the cautions are scrolled on a web browser as necessary by using an information processing apparatus such as a personal computer which is accessible to the second database 43 and includes the web browser.

Also in the third embodiment, model-specific rescue information is classified according to vehicle states in advance. That is, the rescue contents indicating the model-specific rescue information, which is registered in the second database 43 in advance and is described on the model-specific web pages, are classified according to vehicle states in advance. FIG. 11 is a diagram illustrating an example of the information registered in the second database 43 according to the third embodiment. Specifically, as illustrated in FIG. 11, vehicle model IDs (for example, T1), vehicle states (for example, fuel leakage), and source files of the rescue contents included in the web pages for vehicle models of the vehicle model IDs (for example, list-of-preparation-items (fire).jpg) are associated with one another, and are registered in the second database 43 in advance.

Also in the third embodiment, the model-specific rescue information includes initial action information and detailed information. As illustrated in FIG. 11, the source file of the rescue contents indicating the initial action information (for example, quick-reference.jpg) is associated with a state "-" indicating that a vehicle may be in any state. The source file of the rescue contents indicating the detailed information (for example, portion-not-to-be-disconnected.mp4) is associated with the vehicle state (for example, the air bag device is in non-operation or the pre-tensioning device is in non-operation).

The source file of the rescue contents to be registered in the second database 43 (FIG. 11) in advance may include at least one of a source file of web contents out of a source file of a text indicating rescue information (for example, cautions-in-initial-actions.txt), a source file of a still image indicating rescue information (for example, list-of-preparation-items(fire).jpg), a source file of a moving image indicating rescue information (for example, high-voltage-breaking-procedure.mp4), and a source file of URL of web contents indicating rescue information stored in a storage device communicable with the terminal device 6 (for example, response-in-case-of-fire.url).

In the third embodiment, an operation for requesting the rescue organization to rescue an occupant in an accident vehicle is similar to the operation in the first embodiment. In the manufacturer server 4, the following processing is executed in steps S43 to S46 (FIG. 5).

In step S43 (FIG. 5), the extracting unit 401 extracts rescue contents indicating initial action information included in a web page (hereinafter, a specific web page) containing rescue information of the vehicle model, which is registered in the second database 43 (FIG. 10) and is associated with the vehicle model ID specified in step S42 (FIG. 5), as first state-specific rescue contents.

Specifically, in step S43 (FIG. 5), the extracting unit 401 extracts the source files (for example, quick-reference.jpg, cautions-in-initial-actions.txt, st-of-preparation-items(common).jpg), which are associated with the vehicle model ID (for example, T1) specified in step S42 and the state "-" and containing the rescue contents indicating the initial action information, as the first state-specific rescue contents from the second database 43 (FIG. 11).

In step S44 (FIG. 5), the transmitting unit 402 transmits, to the provider server 3, the web page which is extracted by the extracting unit 401 and includes the first state-specific rescue contents (hereinafter, a first state-specific rescue web page), as the first rescue information.

Specifically, in step S44 (FIG. 5), the transmitting unit 402 generates a combination of the source file containing the rescue contents indicating the initial action information extracted as the first state-specific rescue contents by the extracting unit 401, and an HTML file containing an HTML tag (for example, <object data="source file name of rescue contents">) for specifying that the rescue contents of the source file are included in the web page, as the first state-specific rescue web page.

The transmitting unit 402 transmits the generated first state-specific rescue web page (the source files of the rescue contents indicating the initial action information and the HTML file) as the first rescue information to the provider server 3.

In step S45 (FIG. 5), the extracting unit 401 extracts only the rescue contents, which are included in a specific web page and indicate the detailed information (the rescue information) corresponding to the state of the accident vehicle indicated by the state information included in the accident information received in step S41, as second state-specific rescue contents.

Specifically, in step S45 (FIG. 5), the extracting unit 401 extracts, from the second database 43 (FIG. 11), a source file (for example, portion-not-to-be-disconnected.mp4) which contains rescue contents indicating the detailed information and is associated with the vehicle model ID (for example, T1) specified in step S42 and a state of the accident vehicle (for example, the air bag device is in non-operation or the pre-tensioning device is in non-operation) indicated by the state information included in the accident information received in step S41, as second state-specific rescue contents.

In step S46 (FIG. 5), the transmitting unit 402 transmits, to the provider server 3, a web page (hereinafter, a second state-specific rescue web page) containing the second state-specific rescue contents extracted by the extracting unit 401 as the second rescue information.

Specifically, in step S46 (FIG. 5), similarly to the processing in step S44, the transmitting unit 402 generates a combination of the source file containing the rescue contents indicating the detailed information extracted as the second state-specific rescue contents by the extracting unit 401, and an HTML file containing an HTML tag for specifying that web contents indicated by the source file are included in the web page, as a second state-specific rescue web page.

The transmitting unit 402 transmits, to the provider server 3, the generated second state-specific rescue web page (the source file containing the rescue contents indicating the detailed information and the HTML file) as the second rescue information.

Specific Example

A specific example of a case where an accident occurs in which a rear portion of a vehicle is hit at 80 km/h, and then the vehicle collides with a front vehicle will be described below. Information illustrated in FIGS. 10 and 11 is registered in the second database 43 in advance. The vehicle model ID specified in step S42 (FIG. 5) by the extracting unit 401 is "T1". States of an accident vehicle indicated by state information included in accident information reported to the provider server 3 by the reporting unit 21 in step S22 (FIG. 5) are as follows.

The vehicle driving source: HEV, operation states of the respective air bag devices: in operation in the driver's seat and the passenger seat but in non-operation in the right side and the left side, the operation states of the pre-tensioning devices: in operation in the driver's seat and the passenger seat, a number of vehicle collision times and collided portions: rear at first time and front at second time, a vehicle speed at the time of collision: 80 km/h, occupant position: driver's seat and passenger seat, usage of seat belts: use in the driver's seat and the passenger seat, presence of fuel leakage: no fuel leakage, and the operation state of the high-voltage system: ready.

In this case, in step S43 (FIG. 5), the extracting unit 401 extracts, from the second database 43 (FIG. 11), source files "quick-reference.jpg, cautions-in-initial-actions.txt, and list-of-preparation-items(common).jpg" which are associated with the vehicle model ID "T1" and the state "-" as first state-specific rescue contents.

Thus, in step S44 (FIG. 5), first state-specific rescue web pages (the source files "quick-reference.jpg, cautions-in-initial-actions.txt, list-of-preparation-items (common).jpg", and an HTML file) including the extracted first state-specific rescue contents are transmitted as the first rescue information to the provider server 3. As a result, the first rescue information is transmitted to the terminal device 6.

The states of the accident vehicle indicated by the state information included in the accident information include "the operation state of the high-voltage system: ready", "the vehicle speed at the time of collision: 80 km/h or higher", and "a number of vehicle collision times and collided portions: rear at first time and front at second time". Thus, in step S45 (FIG. 5), the extracting unit 401 extracts, from the second database 43 (FIG. 11), a source file "high-voltage-breaking-procedure.mp4" which is associated with the vehicle model ID "T1" and the vehicle states "high-voltage is ready, and vehicle runs and rear of vehicle comes into collision at 30 km/h or higher" as second state-specific rescue contents. Further, the extracting unit 401 extracts source files "operation-and-removal-of-interior-parts.mp4, occupant-safety-necessity-message.txt, and response-to-fire.url", which are associated with the vehicle model ID "T1" and a vehicle state "high voltage is ready or fuel leakage is present", as the second state-specific rescue contents.

The states of the accident vehicle indicated by the state information included in the accident information further include "the operation state of the air bag device: in non-operation in the right side and the left side". Thus, in step S45 (FIG. 5), the extracting unit 401 extracts, from the second database 43 (FIG. 11), a source file "portion-not-to-be-disconnected.mp4", which is associated with the vehicle model ID "T1" and the vehicle state "the air bag device is in non-operation or the pre-tensioning device is in non-operation", as the second state-specific rescue contents.

Thus, in step S46 (FIG. 5), second state-specific rescue web pages (the source files "high-voltage-breaking-procedure.mp4, operation-and-removal-of-interior-parts.mp4, occupant-safety-necessity-message.txt, response-to-fire.url, portion-not-to-be-disconnected.mp4", and the HTML file) including the second state-specific rescue contents extracted in step S45 are transmitted as the second rescue information to the provider server 3. As a result, the second rescue information is transmitted to the terminal device 6.

As described above, according to the third embodiment, state-specific rescue contents are extracted which correspond to the states of the accident vehicle included in the specific web pages containing rescue information of the vehicle model corresponding to the accident vehicle ID registered in the second database 43. The state-specific rescue web pages containing the extracted state-specific rescue contents is transmitted to the terminal device 6 carried by the rescue worker of the rescue organization.

For this reason, even in a case where equipment such as the storage device mounted to the accident vehicle is damaged due to a collision accident or the like, the rescue worker can refer to only cautions corresponding to the state of the accident vehicle included in the rescue information indicated by the state-specific rescue contents in the state-specific rescue web pages transmitted to the terminal device 6 carried by the rescue worker without referring to cautions which do not correspond to the state of the accident vehicle. Thus, the rescue worker can safely and smoothly rescue an occupant in the accident vehicle appropriately to the state of the accident vehicle while following the referred cautions.

The first or second state-specific rescue web page transmitted to the terminal device 6 carried by the rescue worker contains a text (for example, cautions-in-initial-actions.txt (FIG. 11)) indicating the rescue information corresponding to the state of the accident vehicle. In this case, the rescue worker reads the text so as to be capable of understanding the cautions included in the rescue information.

Further, the first or second state-specific rescue web page transmitted to the terminal device 6 carried by the rescue worker contains a still image (for example, the list-of-preparation-items(fire).jpg (FIG. 11)) indicating the rescue information corresponding to the state of the accident vehicle. In this case, the rescue worker views the still image so as to be capable of intuitively understanding the cautions included in the rescue information.

Further, the first or second state-specific rescue web page transmitted to the terminal device 6 carried by the rescue worker contains a moving image (for example, portion-not-to-be-disconnected.mp4 (FIG. 11)) indicating the rescue information corresponding to the state of the accident vehicle. In this case, the rescue worker views the moving image so as to be capable of intuitively and more appropriately understanding the cautions included in the rescue information.

Further, the first or second state-specific rescue web page transmitted to the terminal device 6 carried by the rescue worker contains an URL (for example, response-to-fire.url (FIG. 11)) of the web contents indicating the rescue information corresponding to the state of the accident vehicle stored in the storage device communicable with the terminal device 6. In this case, the rescue worker inputs and the like the URL into the web browser so as to be capable of referring to the web contents indicated by the URL as necessary.

According to the third embodiment, after the first state-specific rescue web page is transmitted as the first rescue information, the second state-specific rescue web page is transmitted as the second rescue information to the terminal device 6 carried by the rescue worker of the rescue organization. Thus, upon the transmission of the first state-specific rescue web page to the terminal device carried by the rescue worker, the rescue worker can quickly refer to the cautions indicated by the initial action information indicated by the web contents on the first state-specific rescue web page, and safely and smoothly take initial actions for rescuing an occupant. After the initial action for rescuing the occupant, the rescue worker can refer to the cautions included in the rescue information corresponding to the state of the accident vehicle indicated by the web contents on the second state-specific rescue web page and safely and smoothly rescue an occupant according to the state of the accident vehicle without referring to cautions included in rescue information which does not correspond to the state of the accident vehicle.

First Modification of Third Embodiment

Also in the emergency reporting system 100 according to the third embodiment, similarly to the first modification of the first embodiment, the reporting unit 21 may periodically report accident information including current state information to the provider server 3 after reporting accident information. Accordingly, the transfer unit 31 may transfer the accident information including the current state information to the manufacturer server 4, and the extracting unit 401 and the transmitting unit 402 may perform the operation according to the flow illustrated in FIG. 7.

In this case, in step S402 (FIG. 7), similarly to the processing in step S45 according to the third embodiment, the extracting unit 401 extracts the rescue contents, which are included in a specific web page and indicate the detailed information (the rescue information) corresponding to a current state of the accident vehicle indicated by the current state information included in the accident information received in step S41, as third state-specific rescue contents.

The transmitting unit 402 determines that third state-specific rescue contents which are not included in the transmitted second state-specific rescue web page as the second rescue information exist in the third state-specific rescue contents extracted by the extracting unit 401 (YES in step S403 (FIG. 7)). In this case, in step S404 (FIG. 7), similarly to the processing in step S46 according to the third embodiment, the transmitting unit 402 generates a web page containing the third state-specific rescue contents, which are not included in the transmitted second state-specific rescue web page, as a new second state specific rescue web page. The transmitting unit 402 then transmits, to the provider server 3, the generated new second state specific rescue web page as the second rescue information.

For example, the information illustrated in FIG. 11 is registered in the second database 43. The current state of the accident vehicle indicated by the current state information included in the accident information received in step S41 is a state that "high-voltage is not ready" and "fuel leakage is present". In this case, in step S402 (FIG. 7), the extracting unit 401 extracts source files "list-of-preparation-items(abnormality of the voltage system).jpg", "list-of-preparation-items(fire).jpg", "operation-and-removal-of-interior-parts.mp4", and "response-to-fire.url" of the rescue contents representing detailed information associated with the current state of the accident vehicle indicated by the current state information, as the third state-specific rescue contents.

The transmitted second state-specific rescue web page contains web contents indicated by the source file "list-of-preparation-items (abnormality of the voltage system).jpg" associated with the state that "high-voltage is not ready". In this case, the transmitting unit 402 determines in step S403 (FIG. 7) that third state-specific rescue contents (web contents indicated by "list-of-preparation-items(fire).jpg", "operation-and-removal-of-interior-parts.mp4", and "response-to-fire.url"), which are not included in the transmitted second state-specific rescue web page, exist.

In this case, in step S404 (FIG. 7), the transmitting unit 402 generates combinations of source files "list-of-preparation-items(fire).jpg", "operation-and-removal-of-interior-parts.mp4", and "response-to-fire.url" of the third state-specific rescue contents not included in the transmitted second state-specific rescue web page, and HTML files containing HTML tags "<object data="list-of-preparation-items(fire).jpg">", "<object data="operation-and-removal-of-interior-parts.mp4">", and "<object data="response-to-fire.url">" for specifying that the web contents indicated by the source files are included in the web page, as a new second rescue-specific web page. The transmitting unit 402 then transmits, to the provider server 3, the generated new second rescue-specific web page as the second rescue information.

In this configuration, from the rescue contents, which correspond to the current state of the accident vehicle indicated by the current state information and are extracted as the third state-specific rescue contents, a new second state-specific rescue web page containing rescue contents which are not included in the transmitted second state-specific rescue web page is transmitted to the terminal device 6.

Thus, the rescue contents of the same contents are prevented from being periodically transmitted to the terminal device 6 carried by the rescue worker, so that only rescue contents including cautions to be necessarily additionally referred to by the rescue worker due to a change in the state of the accident vehicle, can be transmitted to the terminal device 6.

Second Modification of Third Embodiment

Also in the third embodiment and the first modification of the third embodiment, similarly to the third modification of the first embodiment, step S44 (FIGS. 5 and 7) may be omitted. In step S46 (FIGS. 5 and 7), the transmitting unit 402 may transmit the web pages (the state-specific rescue web pages), which include the first state-specific rescue contents extracted in the processing in step S43 and the second state-specific rescue contents extracted in the processing in step S45 to the provider server 3 at the same timing, as the second rescue information (the rescue information). Accordingly, the first rescue information and the demand information are not included in the rescue request information transferred by the transfer unit 31 in step S33 (FIG. 5), and steps S54a, S54b, and S54c (FIG. 6) may be omitted.

Third Modification of Third Embodiment

Also in the third embodiment and the first and second modifications of the third embodiment, similarly to the fourth modification of the first embodiment, if the transfer unit 31 does not transfer the first rescue information to the terminal device 6 in step S33 (FIG. 5), and the transmitting unit 402 executes step S44 (FIG. 5), the transmitting unit 402 may transmit the first rescue information to the terminal device 6. If steps S34 and S35 (FIG. 5) are omitted and the transmitting unit 402 executes step S46 (FIG. 5), the second rescue information may be transmitted to the terminal device 6.

The above embodiments and the modifications thereof are only examples of the present invention, and thus do not limit the present invention.

For example, in the first embodiment and the modifications of the first embodiment, information registered in the second database 43 in advance according to at least one of the second and third embodiments (at least one of the information illustrated in FIGS. 8 and 9 and the information illustrated in FIGS. 10 and 11) may be further registered in the second database 43 in advance. Accordingly, in steps S43 to S46 (FIGS. 5 and 7) and in steps S402 to S404 (FIG. 7), the processing in steps S43 to S46 (FIGS. 5 and 7) and the processing in steps S402 to S404 (FIG. 7) according to the second embodiment, the modifications of the second embodiment, the third embodiment, and the modifications of the third embodiment may be further executed as appropriate.

Similarly, in the second embodiment and the modifications of the second embodiment, information registered in the second database 43 in advance according to at least one of the first and third embodiments (at least one of the information illustrated in FIG. 4 and the information illustrated in FIGS. 10 and 11) may be further registered in the second database 43 in advance. Accordingly, in steps S43 to S46 (FIGS. 5 and 7) and in steps S402 to S404 (FIG. 7), the processing in steps S43 to S46 (FIGS. 5 and 7) and the processing in steps S402 to S404 (FIG. 7) according to the first modification, the modifications of the first embodiment, the third embodiment, and the modifications of the third embodiment may be further executed as appropriate.

Further, in the third embodiment and the modifications of the third embodiment, information registered in the second database 43 in advance according to at least one of the first and second embodiments (at least one of the information illustrated in FIG. 4 and the information illustrated in FIGS. 8 and 9) may be further registered in the second database 43 in advance. Accordingly, in steps S43 to S46 (FIGS. 5 and 7) and in steps S402 to S404 (FIG. 7), the processing in steps S43 to S46 (FIGS. 5 and 7) and the processing in steps S402 to S404 (FIG. 7) according to the first embodiment, the modifications of the first embodiment, the second embodiment, and the modifications of the second embodiment may be further executed as appropriate.

(Comprehension of Embodiments)

According to one aspect of the present invention, an emergency reporting system includes a first server, a second server, and a reporting device which are communicable with each other via a prescribed network, a first database in which identification information for identifying a vehicle and a vehicle model are registered in an associated manner in advance, and a second database in which model-specific rescue information including cautions in rescuing an occupant in an accident vehicle is registered in advance, wherein the first database and the second database are disposed outside the vehicle, the reporting device includes a reporting unit that reports accident information including the identification information of the accident vehicle and state information indicating a state of the accident vehicle to the second server, the second server includes a transfer unit that transfers the reported accident information to a prescribed rescue organization and the first server, and the first server includes a receiving unit that receives the transferred accident information, an extracting unit that refers to the first database, specifies a vehicle model corresponding to the identification information included in the received accident information, and extracts rescue information of the specified vehicle model from the second database, and a transmitting unit that transmits the extracted rescue information to a terminal device carried by a rescue worker of the rescue organization.

According to one aspect of the present invention, an emergency reporting device configuring a first server in an emergency reporting system including the first server, a second server, and a reporting device, which are communicable with each other via a prescribed network, includes a receiving unit that receives accident information including identification information of an accident vehicle reported by the reporting device and state information indicating a state of the accident vehicle via the second server, an extracting unit that refers to a first database disposed outside a vehicle and in which the identification information for identifying the vehicle and a vehicle model are registered in an associated manner in advance, specifies a vehicle model corresponding to the identification information included in the received accident information, and extracts rescue information of the specified vehicle model from a second database disposed outside the vehicle and in which model-specific rescue information including cautions in rescuing an occupant of the accident vehicle is registered in advance, and a transmitting unit that transmits the extracted rescue information to a terminal device carried by a rescue worker of the rescue organization.

Further, according to one aspect of the present invention, there is provided an emergency reporting method in an emergency reporting system including a first server, a second server, and a reporting device, which are communicable with each other via a predetermined network, the method including causing the reporting device to report accident information including identification information of an accident vehicle and state information indicating a state of the accident vehicle to the second server, causing the second server to transfer the reported accident information to a prescribed rescue organization and the first server, and causing the first server to receive the transferred accident information, to refer to a first database disposed outside a vehicle and in which the identification information for identifying the vehicle and a vehicle model are registered in an associated manner in advance, to specify a vehicle model corresponding to identification information included in the received accident information, and to extract rescue information of the specified vehicle model from a second database disposed outside the vehicle and in which model-specific rescue information including cautions in rescuing an occupant in the accident vehicle is registered in advance, and to transmit the extracted rescue information to a terminal device carried by a rescue worker of the rescue organization.

In the emergency reporting system, the emergency reporting device, and the emergency reporting method, the model-specific rescue information including cautions in rescuing an occupant of an accident vehicle is registered in advance in the second database disposed outside the vehicle. The rescue information of the vehicle model, extracted from the second database and corresponding to the identification information of the accident vehicle, is transmitted to the terminal device carried by the rescue worker of the rescue organization.

Thus, even in a case where equipment such as a storage device mounted to the accident vehicle is damaged due to a collision accident or the like, the rescue worker can refer to cautions in rescuing an occupant in a vehicle which is the same vehicle model as the accident vehicle, the cautions being included in the rescue information transmitted to the terminal device carried by the rescue worker. Consequently, the rescue worker can safely and smoothly rescue an occupant in the accident vehicle while following the referred cautions.

Further, in the emergency reporting system, the model-specific rescue information includes initial action information indicating the cautions in an initial action in the rescue, the extracting unit extracts the initial action information included in the rescue information of the specified vehicle model as the first rescue information, and extracts residual information included in the rescue information of the specified vehicle model as second rescue information, and after transmitting the extracted first rescue information, the transmitting unit may transmit the extracted second rescue information.

In this configuration, after the initial action information, which is included in the rescue information of the specified vehicle model and indicates the cautions in the initial action in the rescuing the occupant in the accident vehicle, is transmitted to the terminal device carried by the rescue worker of the rescue organization, the residual information included in the rescue information of the specified vehicle model is transmitted to the terminal device carried by the rescue worker of the rescue organization.

Thus, upon the transmission of the initial action information to the terminal device carried by the rescue worker, the rescue worker can quickly refer to the cautions indicated by the initial action information, and safely and smoothly take the initial action in rescuing the occupant. After the initial action in rescuing the occupant, the rescue worker can refer to the cautions included in the residual rescue information transmitted after the initial action information, and safely and smoothly rescue the occupant.

Further, in the emergency reporting system, the model-specific rescue information includes detailed information including specific cautions after the initial action in the rescue, the detailed information is classified according to a state of the vehicle in advance, and the extracting unit may extract, from the detailed information included in the rescue information of the specified vehicle model, only detailed information corresponding to the state of the accident vehicle indicated by the state information included in the received accident information as the second rescue information.

In this configuration, after the transmission of the initial action information, the detailed information corresponding to the state of the accident vehicle is transmitted to the terminal device carried by the rescue worker of the rescue organization. Thus, after taking the initial action for rescuing the occupants, the rescue worker can refer to the cautions included in the detailed information corresponding to the state of the accident vehicle without referring to cautions included in the detailed information which does not correspond to the state of the accident vehicle. This enables the rescue worker to safely and smoothly rescue the occupant depending on the state of the accident vehicle.

In the emergency reporting system, after reporting the accident information, the reporting unit may periodically report current state information indicating a current state of the accident vehicle to the second server, the transfer unit may transfer the reported current state information to the first server, the receiving unit may receive the transferred current state information, the extracting unit may extract, from the detailed information included in the rescue information of the specified vehicle model, only the detailed information which corresponds to the current state of the accident vehicle indicated by the received current state information as third rescue information, and the transmitting unit may transmit, from the extracted third rescue information, only third rescue information, which is not included in the transmitted second rescue information as the new second rescue information.

In this configuration, the first server periodically receives the current state information indicating the current state of the accident vehicle via the second server. In the detailed information corresponding to the current state of the accident vehicle indicated by the current state information extracted as the third rescue information, only detailed information which is not transmitted as the second rescue information is transmitted as new second rescue information to the terminal device carried by the rescue worker.

This can prevent detailed information of identical contents from being periodically transmitted to the terminal device carried by the rescue worker. As a result, only detailed information including cautions to be necessarily referred to by the rescue worker due to a change in the state of the accident vehicle can be transmitted to the terminal device carried by the rescue worker.

In the emergency reporting system, the transmitting unit may transmit the extracted rescue information to the second server instead of the terminal device, and the transfer unit may further transfer the transmitted rescue information to the terminal device.

In this configuration, the rescue information extracted in the first server is transmitted to the terminal device carried by the rescue worker via the second server. This can save the first server from managing such as information about destinations necessary for transmitting the rescue information to the terminal device.

The invention claimed is:
1. An emergency reporting system comprising:
a first server;
a second server; and
a reporting device,
the first server, the second server, and reporting device being communicable with each other via a prescribed network;
a first database in which identification information for identifying a vehicle and a vehicle model are registered in an associated manner in advance; and
a second database in which model-specific rescue information including cautions in rescuing an occupant in an accident vehicle is registered in advance,
wherein the first database and the second database are disposed outside the vehicle,
the reporting device includes a reporting unit that reports accident information including identification information of the accident vehicle and state information indicating a state of the accident vehicle to the second server,
the second server includes a transfer unit that transfers the reported accident information to a prescribed rescue organization and the first server, and
the first server includes
a receiving unit that receives the transferred accident information,
an extracting unit that refers to the first database, specifies a vehicle model corresponding to the identification information included in the received accident information, and extracts rescue information of the specified vehicle model from the second database, a transmitting unit that transmits the extracted rescue information to a terminal device carried by a rescue worker of the rescue organization, wherein after reporting the accident information, the reporting unit periodically reports current state information indicating a current state of the accident vehicle to the second server, the transfer unit transfers the reported current state information to the first server, the receiving unit receives the transferred current state information, and the extracting unit extracts a detailed information included in the rescue information which corresponds to the current state of the accident vehicle indicated by the received current state information which is not included in the transmitted rescue information.

2. An emergency reporting system comprising:
a first server;
a second server; and
a reporting device,
the first server, the second server, and reporting device being communicable with each other via a prescribed network;
a first database in which identification information for identifying a vehicle and a vehicle model are registered in an associated manner in advance; and
a second database in which model-specific rescue information including cautions in rescuing an occupant in an accident vehicle is registered in advance,
wherein the first database and the second database are disposed outside the vehicle,
the reporting device includes a reporting unit that reports accident information including identification information of the accident vehicle and state information indicating a state of the accident vehicle to the second server,
the second server includes a transfer unit that transfers the reported accident information to a prescribed rescue organization and the first server, and
the first server includes
 a receiving unit that receives the transferred accident information,
 an extracting unit that refers to the first database, specifies a vehicle model corresponding to the identification information included in the received accident information, and extracts rescue information of the specified vehicle model from the second database, and
 a transmitting unit that transmits the extracted rescue information to a terminal device carried by a rescue worker of the rescue organization, wherein
the model-specific rescue information includes initial action information indicating cautions in an initial action in the rescue,
the extracting unit extracts the initial action information included in the rescue information of the specified vehicle model as first rescue information and extracts residual information included in the rescue information of the specified vehicle model as second rescue information,
after transmitting the extracted first rescue information, the transmitting unit transmits the extracted second rescue information,
the model-specific rescue information includes detailed information including specific cautions after the initial action in the rescue, the detailed information is classified according to a state of the vehicle in advance, the extracting unit extracts, from the detailed information included in the rescue information of the specified vehicle model, only detailed information corresponding to the state of the accident vehicle indicated by the state information included in the received accident information as the second rescue information, after reporting the accident information, the reporting unit periodically reports current state information indicating a current state of the accident vehicle to the second server, the transfer unit transfers the reported current state information to the first server, the receiving unit receives the transferred current state information, the extracting unit extracts, from the detailed information included in the rescue information of the specified vehicle model, only the detailed information which corresponds to the current state of the accident vehicle indicated by the received current state information as third rescue information, and the transmitting unit transmits, from the extracted third rescue information, only third rescue information which is not included in the transmitted second rescue information as the new second rescue information.

3. The emergency reporting system according to claim 1, wherein
the transmitting unit transmits the extracted rescue information to the second server instead of the terminal device, and
the transfer unit further transmits the transmitted rescue information to the terminal device.

4. An emergency reporting device configuring a first server in an emergency reporting system including the first server, a second server, and a reporting device, which are communicable with each other via a prescribed network, the emergency reporting device comprising:
 a receiving unit that receives accident information including identification information of an accident vehicle reported by the reporting device and state information indicating a state of the accident vehicle via the second server,
 an extracting unit that refers to a first database disposed outside a vehicle and in which the identification information for identifying the vehicle and a vehicle model are registered in an associated manner in advance, specifies a vehicle model corresponding to the identification information included in the received accident information, and extracts rescue information of the specified vehicle model from a second database disposed outside the vehicle and in which model-specific rescue information including cautions in rescuing an occupant in the accident vehicle is registered in advance,
 a transmitting unit that transmits the extracted rescue information to a terminal device carried by a rescue worker of a rescue organization,
wherein the receiving unit receives current state information indicating a current state of the accident vehicle via the second server, the current state information being periodically reported by the reporting device after reporting the accident information, and
the extracting unit extracts a detailed information included in the rescue information which corresponds to the current state of the accident vehicle indicated by the received current state information which is not included in the transmitted rescue information.

5. An emergency reporting method in an emergency reporting system including a first server, a second server, and a reporting device, which are communicable with each other via a prescribed network, the method comprising:

causing the reporting device to report accident information including identification information of an accident vehicle and state information indicating a state of the accident vehicle to the second server;

causing the second server to transfer the reported accident information to a prescribed rescue organization and the first server;

causing the first server to receive the transferred accident information, to refer to a first database disposed outside a vehicle and in which the identification information for identifying the vehicle and a vehicle model are registered in an associated manner in advance, to specify a vehicle model corresponding to the identification information included in the received accident information, and to extract rescue information of the specified vehicle model from a second database disposed outside the vehicle and in which model-specific rescue information including cautions in rescuing an occupant in the accident vehicle is registered in advance, and to transmit the extracted rescue information to a terminal device carried by a rescue worker of the rescue organization, causing the reporting device to periodically report current state information indicating a current state of the accident vehicle after reporting the accident information to the second server, causing the second server to transfer the reported current state information to the first server, and causing the first server to receive the transferred current state information, to extract a detailed information included in the rescue information which corresponds to the current state of the accident vehicle indicated by the received current state information which is not included in the transmitted rescue information, and to transmit the extracted detailed information to the terminal device.

* * * * *